(12) United States Patent
Yang

(10) Patent No.: US 10,679,512 B1
(45) Date of Patent: Jun. 9, 2020

(54) ONLINE TEST TAKING AND STUDY GUIDE SYSTEM AND METHOD

(71) Applicant: Terry Yang, Fort Washington, PA (US)

(72) Inventor: Terry Yang, Fort Washington, PA (US)

( * ) Notice: Subject to any disclaimer, the term of this patent is extended or adjusted under 35 U.S.C. 154(b) by 489 days.

(21) Appl. No.: 14/754,826

(22) Filed: Jun. 30, 2015

(51) Int. Cl.
*G09B 7/00* (2006.01)

(52) U.S. Cl.
CPC ................... *G09B 7/00* (2013.01)

(58) Field of Classification Search
CPC ............................................... G09B 7/00
USPC .................................. 434/353, 350
See application file for complete search history.

(56) References Cited

U.S. PATENT DOCUMENTS

| | | | | |
|---|---|---|---|---|
| 5,261,823 | A * | 11/1993 | Kurokawa | G09B 7/02 434/321 |
| 5,904,485 | A | 5/1999 | Siefert | |
| 6,011,949 | A * | 1/2000 | Shimomukai | G09B 7/02 434/169 |
| 6,688,889 | B2 * | 2/2004 | Wallace | G09B 7/06 434/307 R |
| 6,743,024 | B1 | 6/2004 | Ivler et al. | |
| 6,801,751 | B1 * | 10/2004 | Wood | G09B 7/02 434/322 |
| 7,153,140 | B2 * | 12/2006 | Ivanir | G09B 5/14 434/322 |
| 7,286,793 | B1 * | 10/2007 | Miele | G09B 7/00 434/323 |
| 8,321,197 | B2 | 11/2012 | Gaudet et al. | |
| 8,491,311 | B2 | 7/2013 | Bodner et al. | |
| 8,506,305 | B2 | 8/2013 | Graham et al. | |
| 8,672,686 | B2 | 3/2014 | Ferreira | |
| 8,696,365 | B1 | 4/2014 | Bainbridge et al. | |
| 8,775,515 | B2 | 7/2014 | Lippert et al. | |
| 2001/0055749 | A1 | 12/2001 | Siefert | |
| 2002/0052860 | A1 | 5/2002 | Geshwind | |
| 2002/0160347 | A1 * | 10/2002 | Wallace | G09B 7/06 434/322 |
| 2003/0014400 | A1 * | 1/2003 | Siegel | G09B 5/00 |
| 2003/0129574 | A1 * | 7/2003 | Ferriol | G09B 5/00 434/362 |
| 2004/0063085 | A1 * | 4/2004 | Ivanir | G09B 5/14 434/322 |
| 2004/0202987 | A1 * | 10/2004 | Scheuring | G09B 7/02 434/118 |

(Continued)

*Primary Examiner* — Eddy Saint-Vil
*Assistant Examiner* — William D Ermlick
(74) *Attorney, Agent, or Firm* — Hanrahan Law Firm, P.A.; Benjamin M. Hanrahan

(57) ABSTRACT

A system and method for presenting an online study guide and testing program is presented herein. In particular, the system and method includes a plurality of test questions stored within a database or question bank and a plurality of testing materials corresponding to subject areas, topics, and specific categories. Each of the test questions are coded or otherwise include a study code associated therewith, the study code representing a particular subject area, category or sub-category. Similarly, the study materials are also coded to represent a subject area, category, or sub-category. Accordingly, once a student has completed a test or assignment, the system and method will automatically detect the student's weak areas via wrong answered questions and provide the study code. The student can then obtain study materials relating to that study code in order to advance his or her knowledge in those weak areas.

15 Claims, 26 Drawing Sheets

(56) References Cited

U.S. PATENT DOCUMENTS

| | | | |
|---|---|---|---|
| 2006/0110718 A1* | 5/2006 | Lee | G09B 7/02 434/350 |
| 2006/0172275 A1* | 8/2006 | Cohen | G09B 7/00 434/350 |
| 2006/0204947 A1 | 9/2006 | Berger et al. | |
| 2007/0048722 A1 | 3/2007 | Spector | |
| 2007/0172809 A1* | 7/2007 | Gupta | G09B 3/00 434/350 |
| 2007/0269788 A1* | 11/2007 | Flowers | G09B 7/00 434/350 |
| 2008/0131863 A1 | 6/2008 | Stuppy | |
| 2008/0254419 A1* | 10/2008 | Cohen | G09B 7/00 434/219 |
| 2009/0233263 A1* | 9/2009 | Meimer | G09B 7/00 434/350 |
| 2009/0287619 A1* | 11/2009 | Liang | G06Q 50/20 706/11 |
| 2009/0298039 A1* | 12/2009 | Glazier | G09B 7/00 434/362 |
| 2010/0005413 A1* | 1/2010 | Liang | G09B 7/00 715/781 |
| 2010/0041007 A1* | 2/2010 | Wang | G09B 7/00 434/322 |
| 2010/0190142 A1* | 7/2010 | Gal | G09B 5/00 434/322 |
| 2010/0190144 A1 | 7/2010 | Miller | |
| 2011/0029591 A1* | 2/2011 | Wood | G09B 7/00 709/203 |
| 2012/0129141 A1 | 5/2012 | Granpeesheh | |
| 2012/0214147 A1* | 8/2012 | Ernst | G09B 7/00 434/353 |
| 2012/0231435 A1* | 9/2012 | McBride | G09B 7/02 434/350 |
| 2012/0244510 A1* | 9/2012 | Watkins, Jr. | G09B 7/00 434/362 |
| 2012/0308980 A1 | 12/2012 | Krauss | |
| 2012/0329028 A1 | 12/2012 | Wee et al. | |
| 2013/0052618 A1 | 2/2013 | Clapp, III et al. | |
| 2013/0149681 A1* | 6/2013 | Tinkler | G09B 7/04 434/167 |
| 2014/0017655 A1* | 1/2014 | Mayumi | G09B 7/02 434/353 |
| 2014/0193791 A1* | 7/2014 | McBride | G09B 7/02 434/350 |
| 2015/0302771 A1* | 10/2015 | Lee | G06Q 50/20 434/191 |
| 2015/0325138 A1* | 11/2015 | Selinger | G09B 7/00 434/322 |
| 2016/0035238 A1* | 2/2016 | Won | G09B 7/02 434/188 |
| 2016/0225274 A1* | 8/2016 | Vahid | G09B 7/02 |
| 2016/0300503 A1* | 10/2016 | Diezmann | G09B 7/08 |

* cited by examiner

Writing Grammar Codes 300

Improving Sentences (IS) & Identifying Sentence Errors (SE)

| # | Category | Code |
|---|---|---|
| 1 | Active vs. Passive Voice | AP( ) |
| 2 | Case Errors | CE( ) |
| 3 | Coordination/Subordination | CS( ) |
| 4 | Dangling Modifier/Participle | DE( ) |
| 5 | Diction Errors | DM( ) |
| 6 | Idioms Errors | IE( ) |
| 7 | Incorrect Comparison | IC( ) |
| 8 | Misplaced Modifier | MM( ) |
| 9 | Mixed Construction | MC( ) |
| 10 | No Error | NOER |
| 11 | Number Agreement | NA( ) |
| 12 | Parallel Structure | PS( ) |
| 13 | Problems with Wordiness/Redundancy | PW( ) |
| 14 | Pronoun-Antecedent Agreement | PA( ) |
| 15 | Run-On Sentence | RO( ) |
| 16 | Sentence Fragment | SF( ) |
| 17 | Shift in Person (point of view) | SP( ) |
| 18 | Subject-Verb Agreement | SV( ) |
| 19 | Verb Tenses | VT( ) |

Improving Paragraphs (IP)

| # | Category | Code |
|---|---|---|
| 20 | Essay Analysis | EAP |
| 21 | Sentence Addition | SAIP |
| 22 | Sentence Combination | SCIP |
| 23 | Sentence Deletion | SDIP |
| 24 | Sentence Revision | SRIP |

Examples of errors:

SV -- The medicine in these bottles are brewed from honey and me.

A swarm of bees are dive-bombing Willie.

Neither of the orcs pack a lunch.

VT -- The troll drank the water and then drops the cup.

Although Toto was only a small dog, Dorothy finds him a big responsibility.

CE -- The eventual winners—him and her—each received a keg of ale.

Between you and I, I'm becoming suspicious of Sybilla.

MM -- The walrus almost ate all of the oysters.

The oyster agreed on Sunday to go for a stroll.

DM -- Hearing the report that a troll had been found in the cellars, the pudding was cleaned.

When presented with the potion, not one drop was drunk.

* For IS & SE questions: pick the concept being tested and then the type of question presented Example: WR_IC!S3

WR -- Writing, IC -- Incorrect Comparison,

IS -- Improving Sentences, 3 -- Difficulty Level

IE -- Buying miserably, the carpenter confessed that a diet of oysters did not agree to him.

Imogen is prone with infatuations. Just ask Peregrine. Is Peregrine compatible for Imogen? I doubt it!

PW -- I drove to the movies in my car to go see a film.

The group's potion was completely finished yesterday night in the evening.

DE -- The walrus waited until the oysters were altogether on the beach before he ate them.

The troll pounced without scarcely a moment's hesitation.

The effects of the storm could be seen everywhere.

SP -- If someone wants to win the race, you must be fast.

PA -- Neither of the twins is wearing their beanie.

Christopher Robin and I always have honey in my tea.

When someone calls, tell them that I'm not home.

PS -- He likes to draw birds, ride bicycles, and hiking trails.

The mandrakes howled until the students returned them to their pots, watered them with apple juice and the lights in the hall were turned off.

FIGURE 6B

Critical Reading Codes — 300, 310, 320

| | SC (Sentence Completion) | | Type of Question | | | Subject of Passage | |
|---|---|---|---|---|---|---|---|
| 1 | One-Blank, One-way | SC1B1W | 9 | Attitude & Tone: the author's view on the subject of a passage | A | 15. | Natural Science (biology, chemistry, etc.) | NS |
| 2 | One-Blank, Two-way | SC1B2W | 10 | Inferences: facts, statements, or ideas that aren't declared outright | I | 16. | Social Science (sociology, psychology, etc.) | SS |
| 3 | Two-Blank, One-way | SC2B1W | 11 | Main Idea: central concepts/ideas that an author explores in a passage, specific perspectives and opinions an author sets forth in regards to his/her main idea | M | 17. | Humanities (history, literature, etc.) | HU |
| 4 | Two-Blank, Two-way | SC2B2W | 12 | Specific Details: explicitly stated in passage | S | 18. | Literary Fiction | LF |
| 5 | One-Blank, No sw, One way | SC1BN1 | 13 | Technique & Organization: passage's method of organization | T | 19. | Entertainment (music, art, dance, etc.) | EN |
| 6 | One-Blank, No sw, Two way | SC1BN2 | 14 | Word Usage: concerns how a specific vocabulary word works in the context of a specific line | W | | Type of Passage | |
| 7 | Two-Blank, No sw, One way | SC2BN1 | *For passage based questions, select from type of question, subject of passage and type of passage; Example: CR_IHULP2 CR – Critical Reading, I – Implied Information, HU – Humanities, LP – Long Passage, 2 – Difficulty Level* | | | 20. | Long Passage | LP |
| 8 | Two-Blank, No sw, Two way | SC2BN2 | M – The main point of the passage is to The passage is primarily concerned with Which of the following titles best describes the content of the passage? | | | 21. | Short Passage | SP |
| | Question wording examples: | | S – According to the author The author states all of the following EXCEPT According to the passage, the chief characteristic of the subject is Which of the following is NOT cited in the passage as evidence of | | | 22. | Dual Long Passage | DL |
| | A – The author's attitude to the problem can best be described as Which of the following best describes the author's tone in the passage? The passage indicates that the author experiences a feeling of | | | | | 23. | Dual Short Passage | DS |
| | I – It can be inferred from the passage that The passage suggests that the author would support which of the following views? The author apparently feels that According to the passage, it is likely that The passage is most likely directed toward an audience of | | T – Which of the following best describes the development of this passage? In presenting the argument, the author does all of the following EXCEPT… The relationship between the second paragraph and the first paragraph can best be described as… | | | 24. | Comparing Passages | CP |
| | | | | | | W – As it is used in the passage, the term…can best be described as In the passage, the word…means The author uses the phrase…to describe | | |

FIGURE 6C

ACT Math Codes — 300

| Pre-Algebra | Code | Intermediate-Algebra | Code | Plane Geometry | Code |
|---|---|---|---|---|---|
| Absolute Value | PAAV | Inequality | IAIE | 3D Geometry | PG3D |
| Data Interpretation | PADI | Matrices | IAMT | Angles | PGAG |
| Fraction & Decimal | PAFC | Quadratic Inequality | IAQI | Area | PGAR |
| Linear Function | PALF | Radical Rational express | IARR | Circles | PGCL |
| Mean, Media, Mod, Range | PAMM | Systems of Equations | IASE | Logical Reasoning & Proofs | PGLR |
| Multiples & Factors | PAMF | *Coordinate Geometry* | *Code* | Perimeter | PGPR |
| Percent & Decimal | PAPD | Circles of Coordinate | CGCC | Planes (triangl, rect, parall, trapz) | PGPL |
| Probability & Counting | PAPC | Curves | CGCV | Reflections & Rotations | PGRR |
| Proportion & Rates | PAPR | Distance Formula | CGDF | Translations | PGTL |
| *Elementary-Algebra* | *Code* | Equation & Graphs | CGEG | Volume | PGVL |
| Exponents | EAEP | Graph of Points | CGGP | *Trigonometry* | *Code* |
| Factoring & Fraction | EAFF | Number Lines graphs | CGNL | Identities & Equations | TGIE |
| Inequality Equations | EAIE | Midpoint Formula | CGMF | Modeling | TGMD |
| Polynomials | EAPL | Number line Graphs | CGNL | Right Triangle Trigonometric Ratios | TGTR |
| Quadratic Function | EAQF | Parallel Perdicular lines | CGPP | Trigonometric Functions | TGTF |
| Variables | EAVR | Slope of lines | CGSL | | |

ACT Science Codes — 300

| Earth science Data representation | Code (310) | Physical science Data representation | Code (310) | Biology Data representation | Code |
|---|---|---|---|---|---|
| Evaluate | EDEV | Evaluate | PDEV | Evaluate | BDEV |
| Interpretation in Charts | EDIC | Interpretation in Charts | PDIC | Interpretation in Charts | BDIC |
| Interpretation in Graphs | EDIG | Interpretation in Graphs | PDIG | Interpretation in Graphs | BDIG |
| Interpretation in Tables | EDIT | Interpretation in Tables | PDIT | Interpretation in Tables | BDIT |
| Understand | EDUN | Understand | PDUN | Understand | BDUN |

| Earth science Research Summary | Code | Physical science Research Summary | Code | Biology Research Summary | Code |
|---|---|---|---|---|---|
| Analysis with Experiments | ERAE | Analysis with Experiments | PRAE | Analysis with Experiments | BRAE |
| Evaluation | EREV | Evaluation | PREV | Evaluation | BREV |
| Understand | ERUD | Understand | PRUD | Understand | BRUD |

| Earth science Conflicting viewpoints | Code | Physical science Conflicting viewpoints | Code | Biology Conflicting viewpoints | Code |
|---|---|---|---|---|---|
| Evaluate Conflicting points | ECEC | Evaluate Conflicting points | PCEC | Evaluate Conflicting points | BCEC |
| Hypotheses of Topic | ECHT | Hypotheses of Topic | PCHT | Hypotheses of Topic | BCHT |
| Problem Solving | ECPS | Problem Solving | PCPS | Problem Solving | BCPS |
| Reasoning | ECRS | Reasoning | PCRS | Reasoning | BCRS |
| Theories | ECTR | Theories | PCTR | Theories | BCTR |

320

SAT PRACT1

You answered the following 2 Questions Wrong:

Question 7  40

Question 22  40

SAT PRACT1

Question 7

A college student bought 11 books for fall classes. If the cost of his anatomy textbook was three times the mean cost of the other 10 books, then the cost of the anatomy textbook was what fraction of the total amount he paid for the 11 books?

| Test Name | Points | 1st Trial Score (Fraction) | 1st Trial Score (%) | Time Spent | Date | WAQ | 2nd Trial Score | Combined Score | Date | WAQ |
|---|---|---|---|---|---|---|---|---|---|---|
| SAT PRACT1 | 34.00 | 34/36 | 94% | 4:23:15 | 6/1/15 | 2 | 1/2 | 35/36 | 6/15/15 | 1 |
| SAT PRACT2 | 32.00 | 32/36 | 89% | 4:09:43 | 6/10/15 | 4 | -- | -- | -- | -- |

FIGURE 7D

SAT PRACT1

Question 22

If Sarah bought 12 pies for $30, how many pies could she have bought for $37.50 at the same rate?

A) 3
B) 9
C) 12
D) 15
E) 21 (CORRECT ANSWER)

FIGURE 7E

| No. | Question | Answer Given | 1st Trial Points | Difficulty | Code | Study Guide Notes |
|---|---|---|---|---|---|---|
| 1 | $38 < 6x + 2 < 44$<br>What is the range of all possible values of x that satisfies the inequality above? | 6.5 | 0.00 | 2 | Math<br>S26_0409<br>AIE2<br>4755 | |
| 2 | If a and b are positive integers and $20,300 = (2 \times 10^a) + (3 \times 10^b)$, what is the value of a + b? | -- | 0.00 | 3 | Math<br>S26_0412<br>AEE2<br>2259 | |

FIGURE 8

GST – Special Triangle   250

Triangles can be classified according to the number
of equal sides it has:
Scalene: no equal sides
Isosceles: two equal sides
Equilateral: all equal sides Triangles can also be classified by the type of angle it has:
Acute: all acute angles
Right: has a right angle
Obtuse: has an obtuse angle In an isosceles triangle,
equal angles are opposite of the equal sides

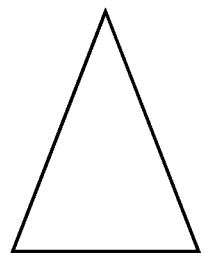

In an equilateral triangle,
all sides are equal and all angles are 60 degrees.

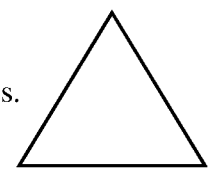

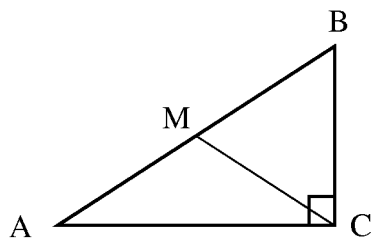

Example
In the figure above, M is ths midpoint of AB, AM=MC,
and the length of MC is 20.
What is the area of the triangle ABC?
A)  200
B)  100 √2
C)  100 √3
D)  200 √2
E)  200 √3

Solution:
Triangle ABC is a 30-60-90 triangle so 1BC=2AB= √(3AC)
M is the midpoint of AB, so AM=MB. AM=MC=MB=20.
Then AB=40. BC=20. AC=20 √3.
Area=1/2 bh = ½(20)(20 √3)=200 √3.
Answer is E.

FIGURE 9D

| Question Number | Question Code | Level | Category | Test | FWA Fraction | FWA (%) |
|---|---|---|---|---|---|---|
| 13 | Math S15_0513 NLT3 1839 | 3 | SAT Math Logical Thinking | SAT PT 15 Math Sec 5 | 22/22 | 100% |
| 19 | Math S15_0319 NSS4 5994 | 4 | SAT Math Sequence & Series | SAT PT 15 Math Sec 3 | 19/20 | 95% |

220 ↗ (from Math S15_0513 / Math S15_0319)
222 ↗ (from 1839 / 5994)
60

FIGURE 10

| Date | Test | 1st Trial Score (%) | 2nd Trial Score (%) | Combined Score | Category | Session Start Time | Session End Time | Time Spent | Problems Attempted |
|---|---|---|---|---|---|---|---|---|---|
| 7/4/15 | Math Com2 | 91% | Not Attempted | -- | Math Com | 11:31pm | 11:47pm | 00:15 | 137 |
| 7/3/15 | Math Com1 | 75% | 75% | 4/6 | Math Com | 1:37pm | 1:39pm | 00:01 | 4 |
| 7/1/15 | SAT HW | 40% | 40% | 4/5 | SAT HW WR | 2:02pm | 2:07pm | 00:04 | 1 |

FIGURE 11

ONLINE TEST TAKING AND STUDY GUIDE SYSTEM AND METHOD

FIELD OF THE INVENTION

The present invention is directed to an online study guide and test-taking system and method, and particularly, to paperless, online tests, assignments, questions/answers and study materials allowing students to complete tests, homework assignments, and access a variety of self-learning materials using a computing device, such as a laptop, desktop, tablet, mobile phone, etc.

BACKGROUND OF THE INVENTION

Conventional based study systems such as physical books and paper-based materials have many drawbacks and problems. For example, a significant amount of time is spent checking answers, scoring tests or assignments and recording test results. Furthermore, many at-home study guides and testing materials do not allow the student to quickly review wrong answered questions or have a chance to fix incorrect answers in a second trial or subsequent test.

Even if the student is able to check for wrong answered questions, or after the teacher or instructor checks for wrong answered questions, in many cases, the student will not have enough time to check why the answer was incorrect, for example, whether the incorrect answer was provided by a careless mistake or by lack of knowledge.

In addition, with many paper-based and other testing materials, students often cannot obtain test results immediately, and instead must wait a day or more before the teacher or instructor can complete the checking and scoring of the test or assignment. Further, students and teachers are often unable to determine which questions are frequently answered incorrectly, thereby determining which questions are difficult, easy or somewhere in between. If the students and teachers are able to determine which questions are most difficult, then they can focus on those questions and answers during subsequent lectures or classes.

There is thus a need in the art for a comprehensive online testing and study guide system and method providing advantages over traditional materials including but in no way limited to immediate access to test results, study materials, identification of weak areas and wrong answered questions, the ability to conduct and take second or subsequent trials, and the ability to identify frequently wrong answered questions in order to focus lecture and class times to the most advantageous topics.

SUMMARY OF THE INVENTION

The various embodiments of the present invention are generally directed to a system and method for presenting an online study guide and testing program which allows students and other users to access a plurality of test questions, as well as testing or study materials from a computing device. For instance, as will be described and/or apparent from the description herein, the system and method reduces or eliminates the need for physical materials, as many or all of the test questions, study materials and results data can be access online via a computer or device such as a tablet or mobile phone, if desired. There is no need to copy physical pages of study guides or study materials, which eliminates a significant amount of costs, time, labor, service fees, and wear and tear on physical copy machines and printers.

Furthermore, the system and method of the present invention may provide accurate and automatic detection of weak areas for each student or user. For example, based upon test results (such as a placement test), students or other test takers can have an opportunity to make up for personal weak areas by virtue of having questions and study materials uniquely coded via study codes. In particular, when a student takes a test or completes an assignment, study codes will be presented for weak areas, or in other words, for questions or topic in which the student answered incorrectly. Using the study codes, the student is able to access study materials corresponding to those topics, categories, etc. via the system and method of the present invention. This provides useful information to the student regarding his or her weak areas allowing the student to narrow down which topics he or she should focus on and study. This can significantly help the student achieve higher scores.

Moreover, using the system and method of the present invention, the student is able to access weak areas and study materials from past tests and past assignments, allowing him or her to continuously refresh and stay on top of the materials, as needed. For instance, information or knowledge is often lost in an individual's memory within about one to two weeks. The system and method of the present invention allows the student to continuously and consistently practice weak areas and learned material online, even after months have passed.

In addition, the system and method provides a significant amount of flexibility for the selection of questions and test materials to be provided to the student(s) for a proper level of practice questions and supplemental or study materials. For instance, a supervisor, director or management staff member can create, select, edit and transfer questions and materials contained in a question bank, as needed or as desired. The database or question bank consists of a hierarchal structure of users (supervisor, director, teacher, student) so that upper level accounts can manage and control lower level accounts at any time and for convenience. In this manner, a supervisor, director or teacher can provide a proper level of practice questions and study materials to a student who need to make up for weak areas based upon test results and study codes.

Some embodiments further provide real-time test results and progress reports for students, teachers and parents. For instance, the progress of a student and the results of tests taken by the student can be accessed immediately and in real-time by the student, teachers, or even the student's parents in some cases. This can force the student to work harder and progress through the study materials and tests because the parents are able to log in and view the progress immediately and at any time.

These and other objects, features and advantages of the present invention will become more apparent when the drawings as well as the detailed description are taken into consideration.

BRIEF DESCRIPTION OF THE DRAWINGS

FIGS. 6A through 6F illustrate exemplary code charts providing raw codes by subject area as disclosed in accordance with at least one embodiment of the present invention.

FIG. 7C is a schematic representation of an exemplary screenshot illustrating a subsequent test or WAQ module as disclosed in accordance with at least one embodiment of the present invention.

FIG. 7D is another schematic representation of an exemplary screenshot illustrating the results display module in accordance with at least one embodiment of the present invention.

FIG. 7E is a schematic representation of an exemplary screenshot illustrating a review of a correct answer to a question as disclosed herein.

FIG. 8 is a schematic representation of an exemplary screenshot illustrating the review module as disclosed in accordance with at least one embodiment of the present invention.

FIG. 9D is a schematic representation of exemplary study materials as disclosed in accordance with at least one embodiment of the present invention.

FIG. 10 is a schematic representation of an exemplary screenshot illustrating the frequency of wrong answered questions module as disclosed in at least one embodiment of the present invention.

FIG. 11 is a schematic representation of an exemplary screenshot illustrating the report module as disclosed in at least one embodiment of the present invention.

Like reference numerals refer to like parts throughout the several views of the drawings provided herein.

DETAILED DESCRIPTION OF THE INVENTION

Figure 1:
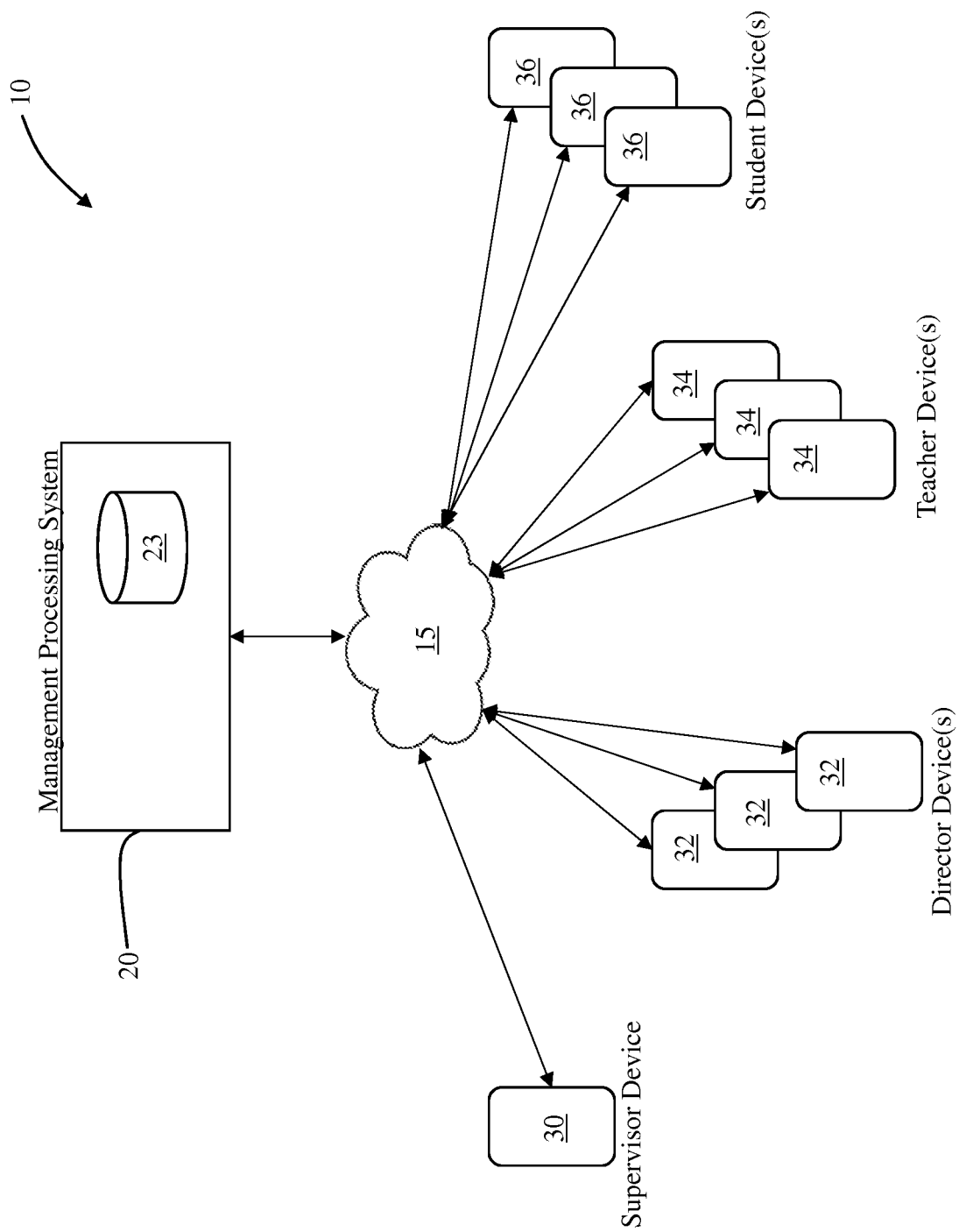
FIG. 1 is a schematic representation of the online testing system as disclosed in accordance with at least one embodiment of the present invention.

As shown in the accompanying drawings the present invention is directed to a system 10 and method 100 for presenting an online study guide and testing program which allows students and other users to access a plurality of test questions, as well as testing or study materials from a computing device. Specifically, referring to FIG. 1, the system 10 of at least one embodiment of the present invention includes a management processing system 20 disposed in a communicative relation with at least one computer or communication network 15, such as the World Wide Web, Internet, Intranet, Wide Area Network(s), Telecommunication Network(s) (e.g., 3G, 4G, LTE), etc. In this regard, the various users 30, 32, 34, 36 (e.g., supervisor, director, teacher, and student) of the present invention may have controlled access to the management processing system 20 and the various contents thereof, as described herein. Particularly, each of the users 30, 32, 34, 36 may have access to certain portions or certain contents (depending on access restrictions, for example) via a username, password or other identifying credentials.

Accordingly, the users 30, 32, 34, 36 may access the management processing system 20 (and in particular, various test questions, tests, study materials, etc.) by visiting a certain website (e.g., via a web browser), opening or executing an application (e.g., a mobile or desktop application), etc., via user or computer device. As should be apparent, and as mentioned above, the computing device(s) accessed or used by the various uses to access the management processing system 20 and/or various features and components of the present invention may include virtually any computer based system, such as, but not limited to, a desktop computer, laptop computer, mobile computer, tablet, phone, media device, game device, PDA, etc.

Figure 2:
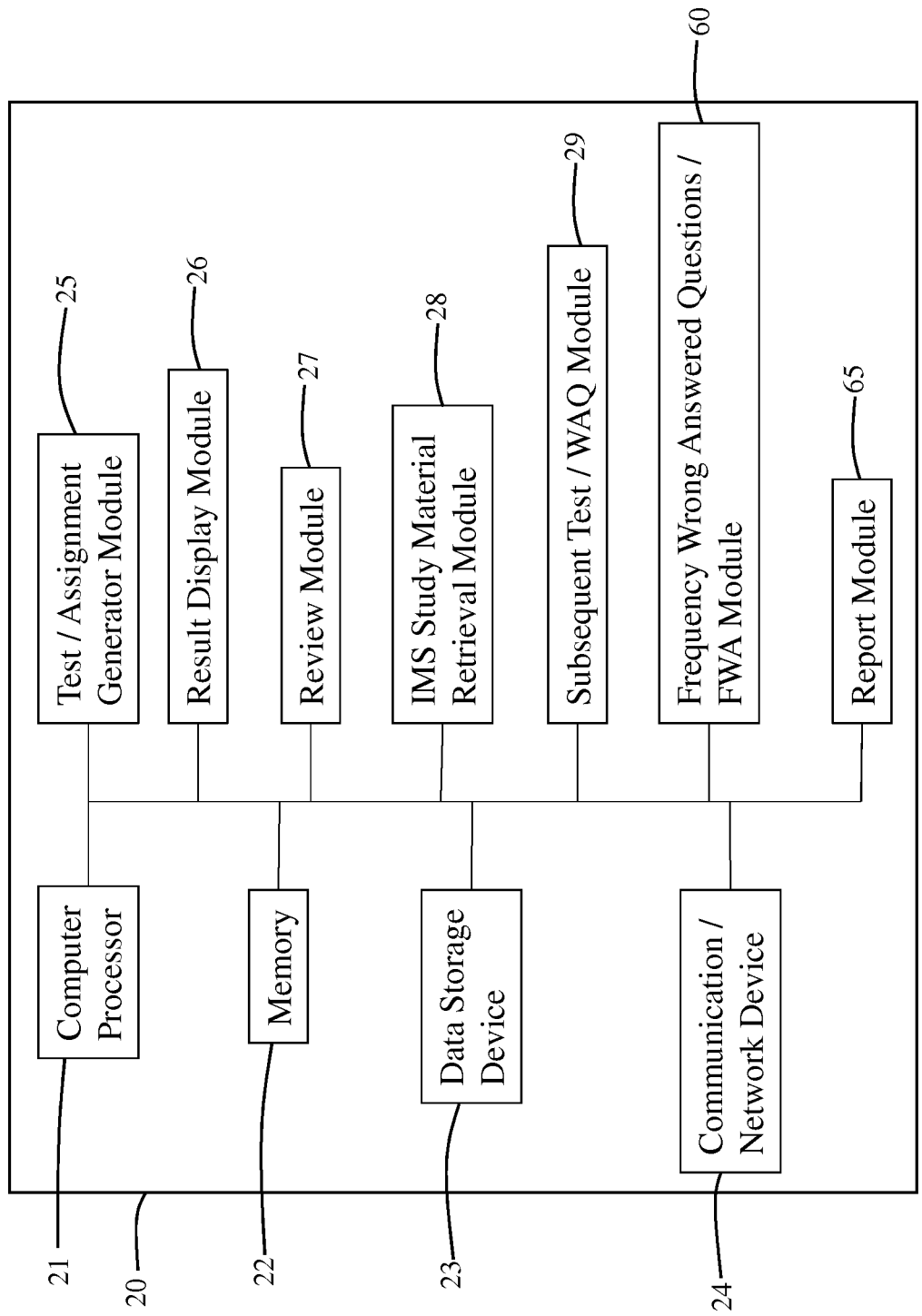
FIG. 2 is a block diagram illustrating at least some components of the management processing system as disclosed in accordance with at least one embodiment of the present invention.

Furthermore, referring now to the schematic representation of the management processing platform/system 20 as represented in FIG. 2, it is noted that the system 20 of at least one embodiment includes, among other components and devices structured to facilitate implementation of the present invention in the intended manner, a computer processor 21, memory 22, a data storage device 23, and a communication or network device(s) 24. Specifically, as used herein, the processor 21 of at least one embodiment may include any device cooperatively structured to execute or implement computer instructions, software, etc., including, for example, the various features and components as described in accordance with at least one embodiment of the present invention and configured to implement the method 100 herein. The data storage device 23, as used herein, may include a hard disk drive, CD/DVD, USB drive, solid state drive, virtual drive, could-based storage drive, or other types of volatile or non-volatile memory. Further, the memory device 22 as used herein, may include but is not limited to random access memory (RAM) or other like devices configured to implement the present invention in the intended manner, for example, by at least temporary storing and assisting with the execution of one or more applications, modules, or components capable of implementing the system 10 and method 100 described herein. Moreover, the communication device 24 may include a network communication hardware/software component structured to facilitate communication between the management processing system 20 and the various user devices 30, 32, 34, 36 of the present invention. Accordingly, examples of the management processing platform/system 20 of the present invention may include a web or cloud-based computer or server, desktop computer, laptop computer, or mainframe, although it is contemplated that more mobile devices such as a tablet, mobile or handheld computer, etc. can be used in certain implementations.

Figure 3:
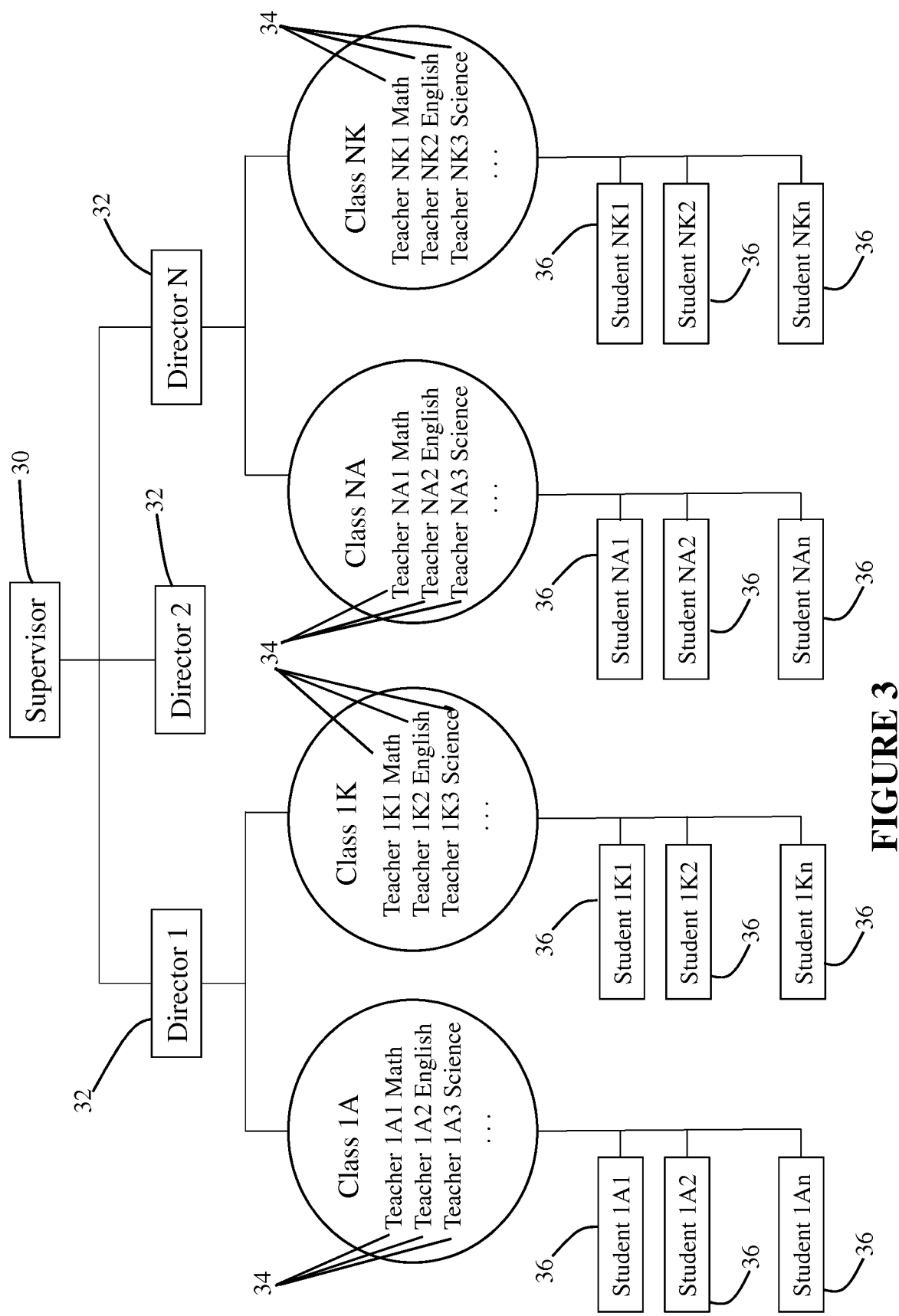
FIG. 3 is a diagram illustrating the hierarchical relationship of various user accounts as disclosed in accordance with at least one embodiment of the present invention.

With reference to FIG. 3, a hierarchal representation is shown to exemplify the various users and the level of controlled or, in some cases, unfettered access each of the users or user levels may have to the system 10 and method 100 of at least one embodiment of the present invention. For example, at least one embodiment may employ or implement one or more of the following user levels: supervisor 30, director 32, teacher 34 and student 36.

In particular, a supervisor 30 may access the system 10 and method 100 and may control all of the accounts or users below the supervisor 30 in the hierarchy, for example, the accounts for directors 32, teachers 34 and students 36. The supervisor 30 may access, add, and delete any of the accounts for any of the directors 32, teachers 34 and students 36 from any location at any time. Additionally, in some embodiments, the supervisor may prepare or generate one or more class assignments or tests by selecting a subset of questions from a question bank, for example.

Moreover, the director 32 accounts are capable of controlling user accounts for teachers 34 and students 36 that are assigned to or associated with the director's 32 region, district, or other location. In this manner, the directors 32 cannot access or control accounts (including director 30 accounts, teacher 34 accounts or student 36 accounts) that are assigned to or associated with a different region, district or location, for example.

Furthermore, teacher 34 accounts can manage or control the assigned class(es), including, for example, student 36 accounts that the director 32 assigns, for their location only. For example, one teacher cannot access, control or manage students that are assigned to a different teacher, even if those students are in the same location, region, district, etc. As an example, teacher accounts may assign homework to student accounts, generate tests, assign tests for student accounts, review questions and answers with students, etc. via the system 10 and method 100 of the present invention, as described herein.

Student 36 accounts of at least one embodiment do not have any management authority or control over other accounts. However, student accounts can be used to access the system 10 and method 100 of the present invention, and in particular, to access certain tests, study materials, questions, answers, notes, and other resources that are assigned or provided via a supervisor, director or teacher.

More in particular, the supervisor may also control or manage tuition fees, registration of students, teachers, and directors, and other high-level management of the system 10 or method 100 of the present invention. For instance, in some embodiments the tuition fees, study material fees, network fees, discounts and other fee management may only be controlled or managed by the supervisor. Therefore, in such an embodiment, the director(s) cannot unilaterally change tuition amounts or fees, and the supervisor can view all of the tuition amounts collected from each director. In some embodiments, the director must pay a royalty (e.g., a percentage of the tuition fees collected) to the supervisor and the system 10 of the present invention can easily and automatically track and manage those amounts. It should also be noted that the director(s) may only view the total tuition amounts only for the location, district, region, etc. for which the director is in charge of. Using the system 10 and method 100 of at least one embodiment, the supervisor and director(s) can view tuition information for any periods of time and calculate the total amount of tuition for that time.

Furthermore, in certain embodiments, tests and assignments are based upon or generated from a question bank comprising a plurality of test questions. The supervisor may collect the pertinent questions and compile one or more tests or assignments. For example, the supervisor can generate a placement test consisting of Math, Critical Reading and Writing questions taken from the question bank. Once the test(s) or assignment(s) are created, they can be published to teachers and students for use. Directors can create assign some tests, assignments and study material to certain classes, depending on, for example, the scope, goal or difficulty level of the class. Directors can register teachers and students to a particular class, whereby the teacher and student can only access materials related to that assigned class.

Figure 4A:
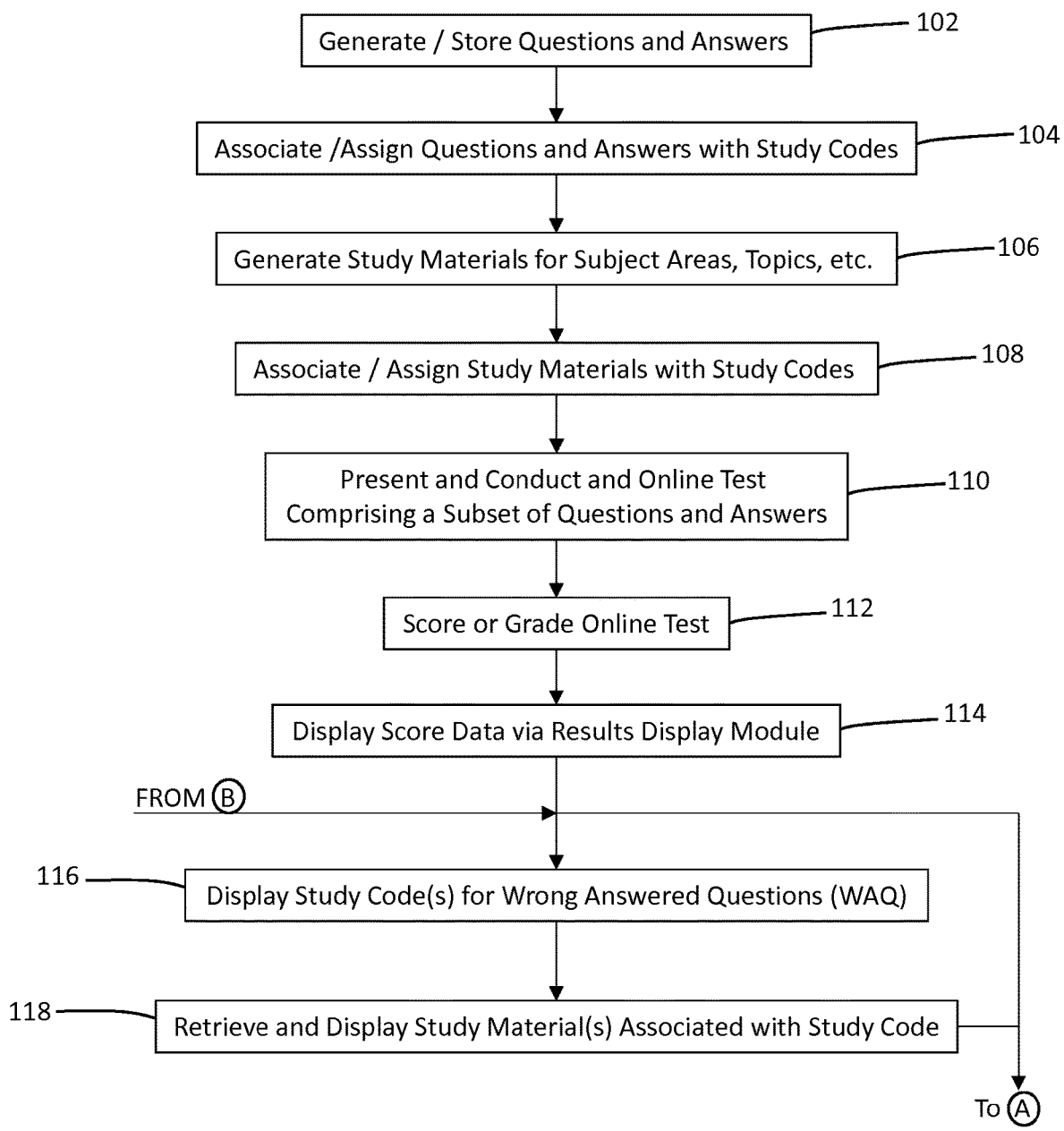
FIGS. 4A and 4B are exemplary flow charts illustrating the method as disclosed in accordance with at least one embodiment of the present invention.

Referring now to the flow chart of FIG. 4A, the method 100 of at least one embodiment may include generating and/or storing a plurality of test questions, generally referenced as 102. For example, a supervisor 30, director 32 or teacher 34 may access the management processing system 20 via a corresponding user device and input or generate one or more test questions 200. For instance, it is contemplated that the questions 200 may be generated from scratch, meaning, that the user can simply type in the test questions 200 and answers, however, other embodiments may allow the test questions 200 to be uploaded or imported from other sources, whether one-by-one or in a batch upload.

Still referring to FIG. 4A, at least some of the test questions 200 can then be assigned to or associated with one or more question codes 210 or study codes 220. As an example, each test question 200 may be assigned to one or more subject areas 300, including, but in no way limited to Math, Vocabulary, Grammar, Science, Reading, etc. Within each subject area 300, there are specific categories 310 and/or sub-categories that correspond to common testing or study material or common topics within the subject area 300. Each of the categories 310 or sub-categories may be assigned a specific and unique raw code 320. As described herein in accordance with at least one embodiment, that raw code 320 is then used to generate or create a study code 220, which is then assigned or associated with each of the test questions 200. As will be described herein, the raw code 320 may be assigned directly to the test question 200 such that the study code 220 and the raw code 320 are identical. However, in certain cases, the study code 220 may include a combination of one or more different raw codes 320 and/or difficulty levels.

As will be described herein, the study code 220 can be used by the student, teacher or other user in order to access and retrieve study materials 250 relating to the specific subject area 300, category 310, sub-category, etc. In some embodiments, the study code 220 is only provided to the student in relation to test questions in which the student answered wrong in a test or assignment. Accordingly, in such an embodiment, the student may only be able to access study materials for the specific categories 310 or sub-categories in which the student is weak, meaning only in those areas where the student answered incorrectly in a test, homework assignment, practice test, etc. Accordingly, the study code 220 is designed for students to independently work on improving their knowledge and skills in their weak areas. By utilizing the study code 220 and accessing the corresponding study materials, students can prevent answering the same types of questions wrong again in the future, and can therefore, improve their scores on subsequent tests. Other embodiments may allow the students to access study materials via the study code 220 regardless of whether a particular question was answered correctly or incorrectly.

Figure 5A:
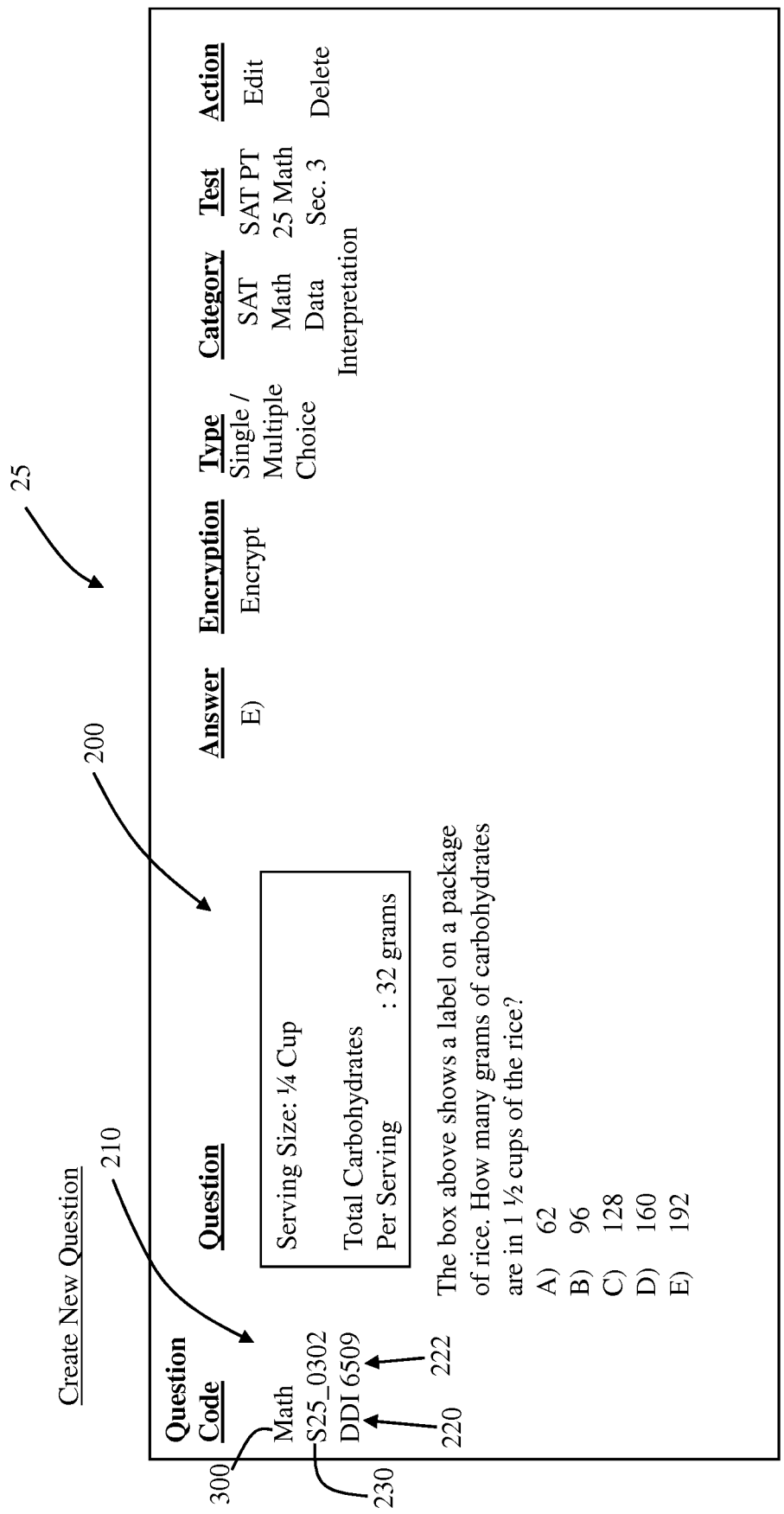
FIG. 5A is a schematic representation of an exemplary screenshot illustrating the test/assignment/question generator module of at least one embodiment of the present invention.

For example, referring to FIG. 5A, a test question 200 is generated, created and/or stored via the management processing system 20, wherein the user 30, 32, 34 may provide the question contents, a series of possible answers (e.g., (a)-(e)), a correct answer, type of question (e.g., single/multiple choice, short answer, essay, etc.), and a category 310. Furthermore, a question code 210 may be assigned or generated for each of the test questions 200. In at least one embodiment, the question code 210 may include an identification of the subject area 300, an identification of a test in which the question is assigned 230, a study code 220, and a password 222. In the example shown in FIG. 5A, the subject area 300 is "Math," the test identification 230 is "S25_0302," the study code 220 is "DDI" and the password 222 is "6509."

The test identification code 230 of at least one embodiment of the present invention represents a particular test or assignment in which this particular question is assigned. In the example provided in FIG. 5A, the "S25" represents the 25th SAT Placement Test, and the "0302" represents that the question appears in Section 3, Question 2. The test identification code 230 may be used for internal organization and in many embodiments of the present invention is not necessary for the intended operation of the study code 220.

Particularly, still referring to the example provided in FIG. 5A, the study code 220 "DDI" is assigned from a precompiled or predetermined list of codes associated with subject areas 300 and categories 310 or sub-categories. Particularly, referring to FIG. 6A, an exemplary and non-limiting chart is provided for illustrating the various raw codes 320 associated with categories/sub-categories 310 for the "Math" subject area 300. Specifically, in this example, the "Math" subject area 300 includes forty nine (49) categories or sub-categories 310, each of which is assigned a raw code 320. Because the test question provided in FIG. 5A relates to Math Data Interpretation, the raw code 320 of "DDI" was assigned to the question as the study code 220. Of course, other codes may be implemented and other categories/sub-categories may be implemented within the full spirit and scope of the present invention. As provided herein, the students 36 may use this study code 220 to access study materials relating to Math Data Interpretation, for example, if the student 36 answers this particular question presented in FIG. 5A or another question with the same study code 220 incorrectly.

Figure 5B:
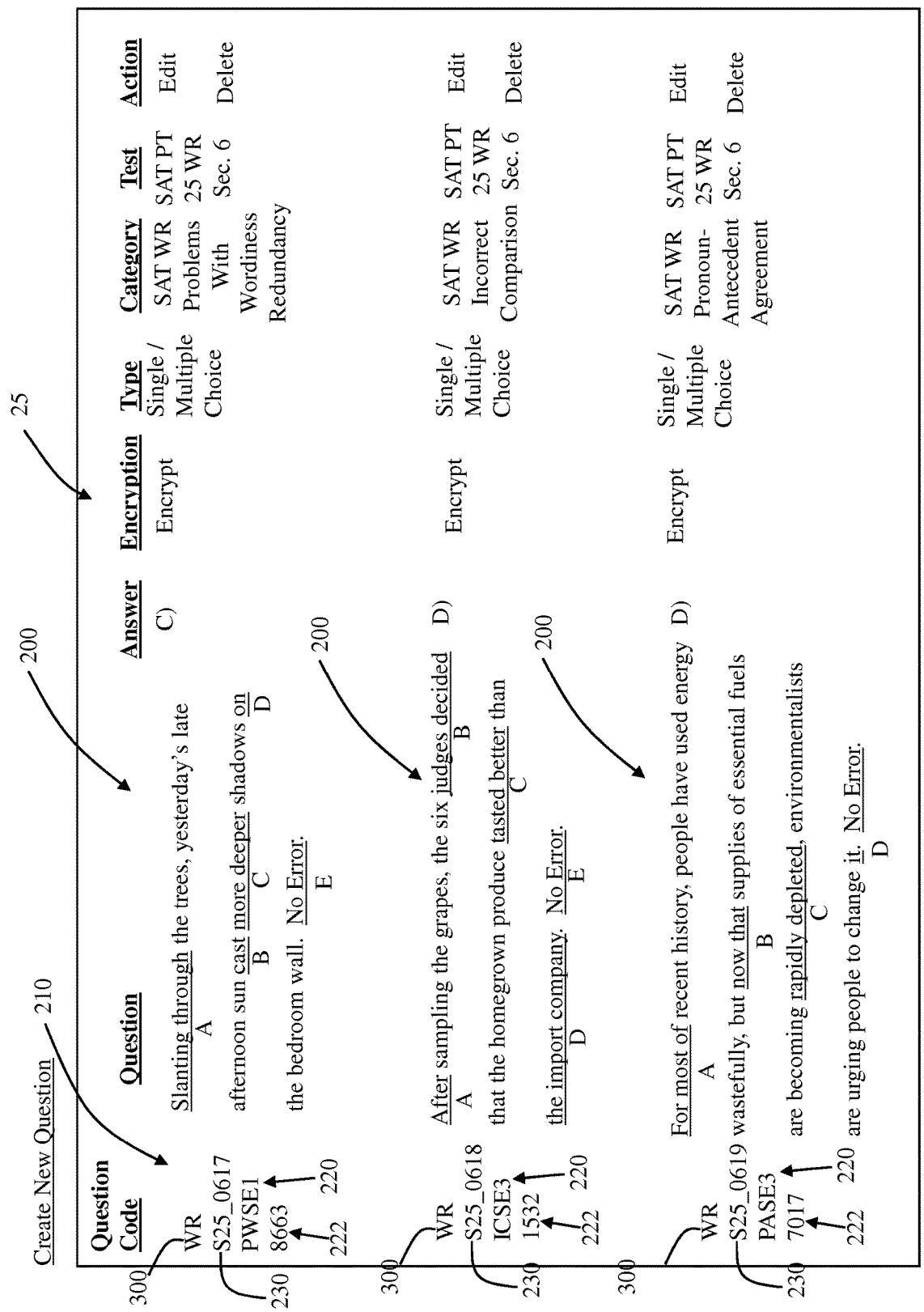
FIG. 5B is another schematic representation of an exemplary screenshot illustrating the test/assignment/question generator module of at least one embodiment of the present invention.

Referring now to the example provided in FIG. 5B, three further test questions 200 are shown. In this example, each of the question codes 210 include an identification that the subject area 300 is "Writing/Grammar" via the code "WR." Of course, other codes can be used. Further the test identification codes 230 represent that the questions 200 came from or are associated with the 25th SAT Placement Test, Section 6, questions 17, 18 and 19. Referring to the study codes 220, an exemplary and non-limiting chart is provided for illustrating the various raw codes 320 associated with categories/sub-categories 310 for the "Writing/Grammar" subject area 300. Particularly, the study code "PWSE1" associated with the first question provided in FIG. 5B, represents a combination of raw codes 320 taken from the precompiled chart of FIG. 6B. For example, because the first question in FIG. 5B relates to the categories "Problems with Wordiness/Redundancy" and "Identifying Sentence Errors," the combined code "PWSE" is created. Also, the study code 220 of certain embodiments may identify an assigned difficulty level corresponding to the question 200. In the example of the first question provided in FIG. 5B, the difficulty level assigned is "1," and therefore, the final study code 220 for this question 200 is "PWSE1." It should be noted that the difficulty level may be assigned by one of the users (e.g., supervisor, director or teacher) or in some embodiments may come from the source of the question 200, for example, if the question 200 came from another study guide, a past exam or test, etc.

Turning now to the second question 200 provided in FIG. 5B, and referring to the study code 220 thereof, the study code "ICSE3" associated represents a combination of raw codes 320 taken from the exemplary precompiled chart of FIG. 6B. For example, because the second question in FIG. 5B relates to the categories "Incorrect Comparison" and "Identifying Sentence Errors," the combined code "ICSE" is created. Also, in this example, the difficulty level assigned is "3," and therefore, the final study code 220 for this question 200 is "ICSE3."

Similarly, referring now to the third question 200 provided in FIG. 5B, and referring to the study code 220 thereof, the study code "PASE3" represents a combination of raw codes 320 taken from the exemplary precompiled chart of FIG. 6B. For example, because the third question in FIG. 5B relates to the categories "Pronoun-Antecedent Agreement" and "Identifying Sentence Errors," the combined code "PASE" is created. Also, in this example, the difficulty level assigned is "3," and therefore, the final study code 220 for this question 200 is "PASE3."

Figure 5C:
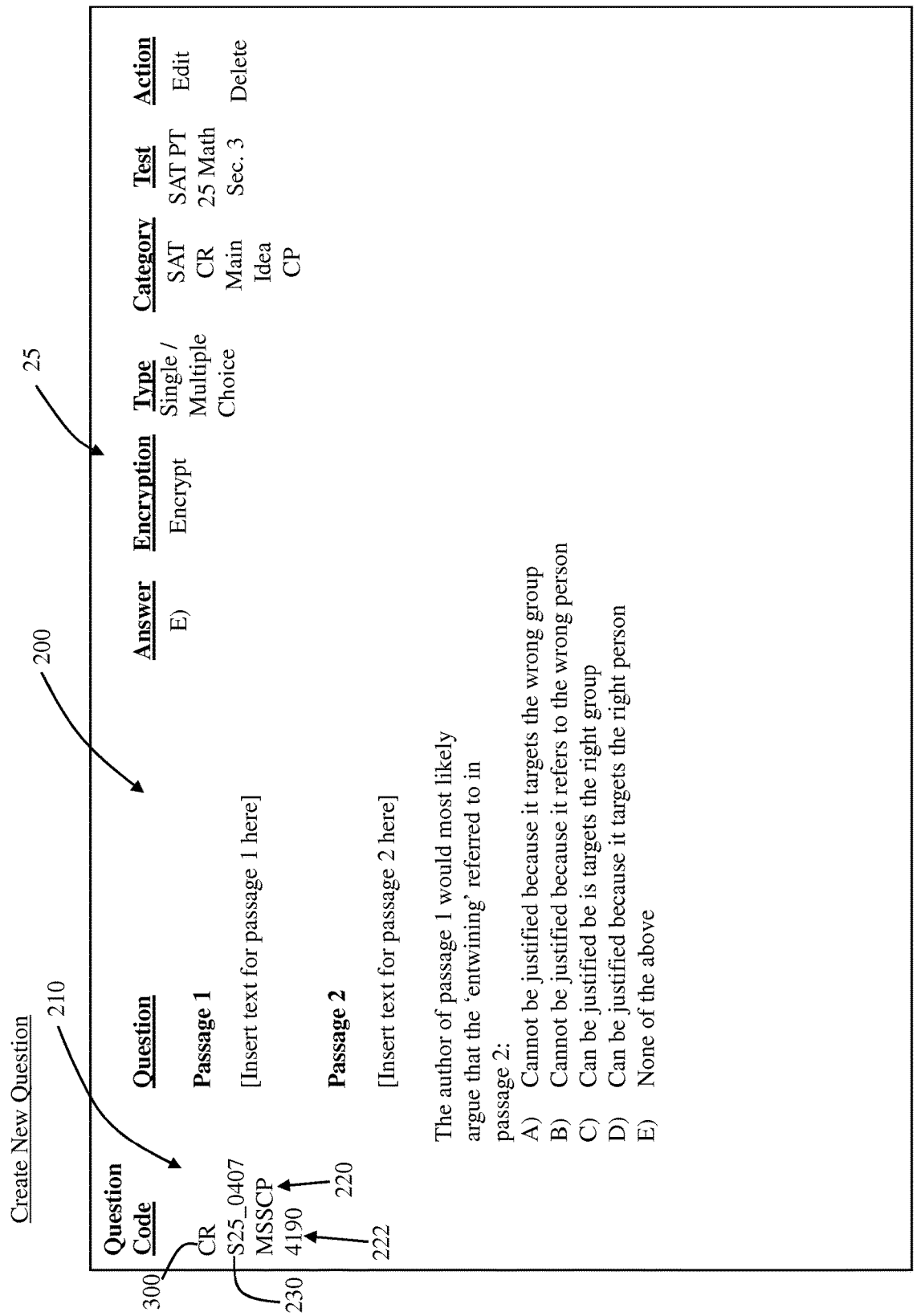
FIG. 5C is yet another schematic representation of an exemplary screenshot illustrating the test/assignment/question generator module of at least one embodiment of the present invention.

Referring now to the example provided in FIG. 5C, yet another exemplary test question 200 is shown. In this example, the question code 210 includes an identification that the subject area 300 is "Critical Reading" via the code "CR." Of course, other codes can be used. Further the test identification code 230 represents that the question 200 came from or is associated with the 25th SAT Placement Test, Section 4, Question 7. Referring to the study codes 220, an exemplary and non-limiting chart is provided for illustrating the various raw codes 320 associated with categories/sub-categories 310 for the "Critical Reading" subject area 300. Particularly, the study code "MSSCP" associated with the exemplary test question 200 provided in FIG. 5C, represents a combination of raw codes 320 taken from the precompiled chart of FIG. 6C. For example, because the exemplary test question in FIG. 5C relates to the categories "Main Idea," "Social Science," and "Comparing Passages," the combined code "MSSCP" is created using the corresponding raw codes 320.

Still referring to FIG. 6C, in some embodiments, the code charts may be organized in a manner such that when the study code 220 is compiled from a combination of raw codes 320 from the chart, the chart may comprise different groupings such that the raw codes 320 from different groupings are selected. In the example of FIG. 6C, the groupings include "Type of Question," "Subject of Passage," and "Type of Passage." Also, in order to create consistency and organization, selection of the raw codes 320 to create the study code 220 may, in some cases, be selected in order from the lowest assigned category number 312. In this example, "Main Idea" category has a category number of "11," "Social Science" has a category number of "16," and "Comparing Passages" has a category number of "24." Thus, the combined study code 220 would be selected in the order of "Main Idea"—"Social Science"—"Comparing Passages." The selection order may be defined in other ways, including the groupings, etc.

Figure 6A:
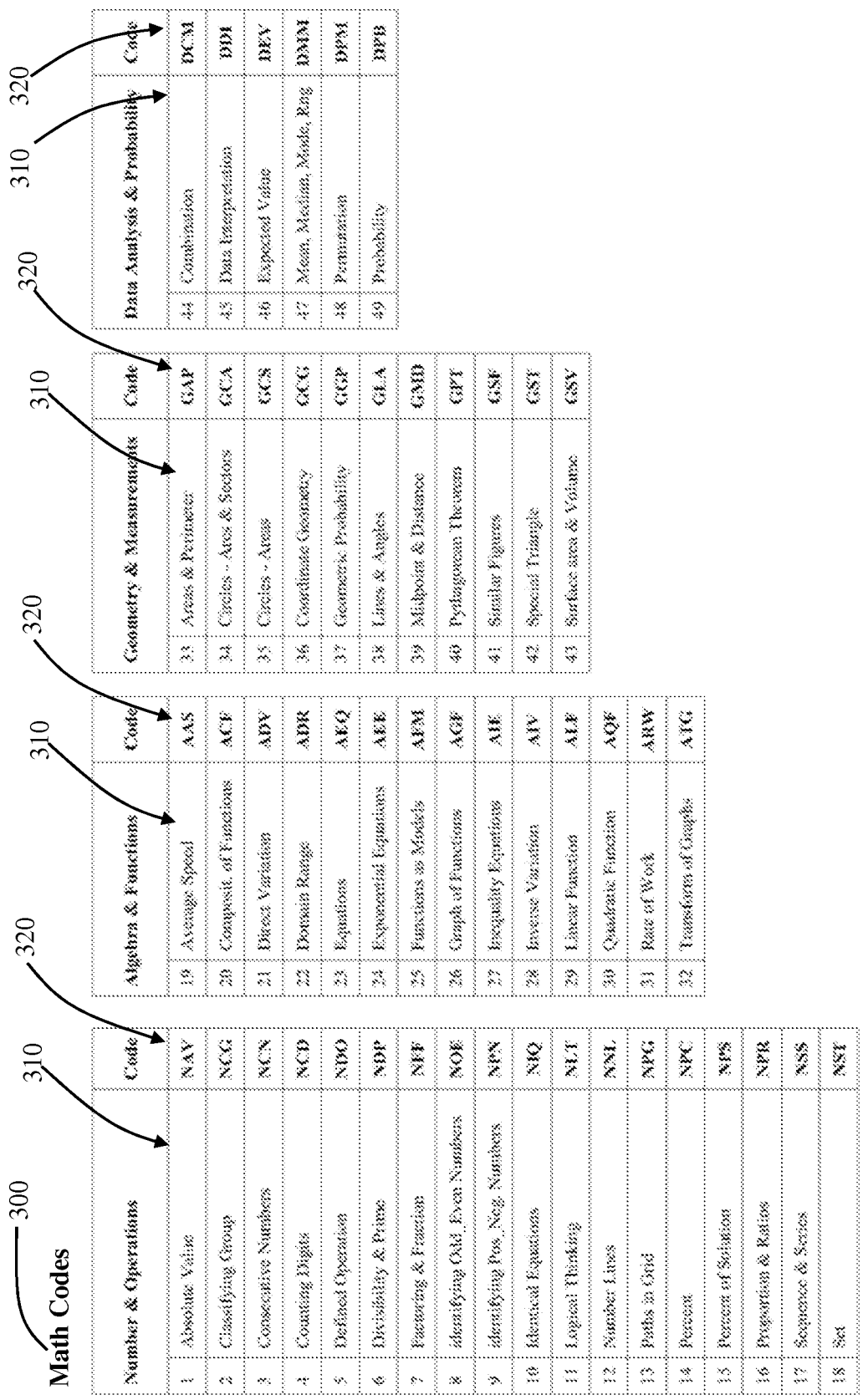
Figure 6D:
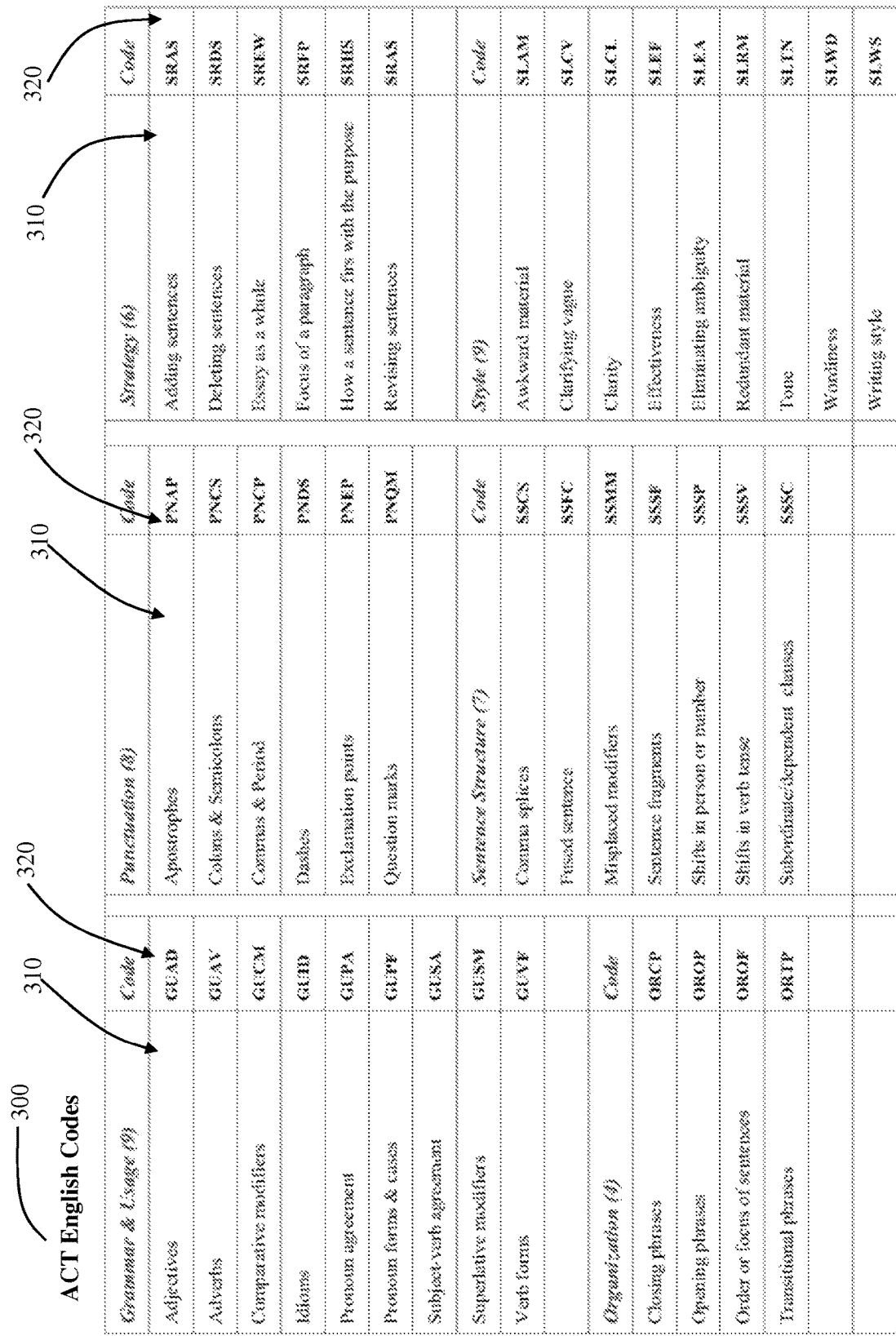

FIGS. 6D, 6E and 6F represent further exemplary and non-limiting code charts organized by subject areas "ACT English," ACT Math," and "ACT Science," respectively. However, it should be noted and apparent that other charts, subject areas, categories, sub-categories, groupings, and raw codes can be implemented within the full spirit and scope of the various embodiments of the present invention, and thus, the charts provided in FIGS. 6A through 6F should be deemed as exemplary and illustrative only.

Referring back to FIG. 4A, at least one embodiment further includes generating or providing study materials, generally referenced as 106. Particularly, the study materials 250 of at least one embodiment may include, for example, a plurality of written explanations, diagrams, figures, or tips configured to help the student 36 improve his or her skills or knowledge relative to the materials provided. The study materials 250 may also include, for example, one or more example or sample questions and answers or solutions, as well as practice questions. For instance, each of the sample questions/answers may include a question, with an answer and an explanation as to how or why the answer is correct. The practice questions may include a series of questions without answers, or with answers provided once the series of questions is completed by the student. The study materials 250 may be stored on the management processing system 20 and associated with a study code 220 for subsequent retrieval and review.

For instance, the method 100 may include associating or assigning the study materials with a study code, generally represented as 108 in FIG. 4A. Particularly, the study codes 220 provided above and assigned or associated with the test questions 200 may also be associated with the study materials 250. In this manner, in at least one embodiment of the present invention, the study materials 250 that pertain to a particular subject area 300, category or sub-category 310, for instance, will be assigned a corresponding study code 220 in a similar manner as the test questions 200 described above. For example, study materials that relate to "Data Interpretation" within the subject area 300 "Math" will be assigned the same study code 220 as the test questions 200 that relate to the same subject area 300 and category (i.e., "DDI"). Certain embodiments may assign a corresponding study code 220 to the study materials rather than an identical, verbatim study code.

Either way, as provided herein, the study codes 220 of the various embodiments of the present invention are configured to allow the student(s) 36 or other users to access study materials the correspond to wrong answered questions (WAQ), or questions the student incorrectly answered during a test or assignment.

In particular, the method 100 further includes generating, presenting and conducting an online test or assignment, generally represented as 110 in FIG. 4A. For instance, the system 10 of at least one embodiment may include a test generator module 25, which is structured to facilitate the generation of a test or assignment comprising a series of a plurality of questions that are stored on the management processing system 20.

Particularly, in at least one embodiment, the test generator module 25 may only be accessed or used by the supervisor 30 account, although other embodiments may allow other user accounts, e.g., director, teacher and student to access the test generator module 25. For instance, the test generator module 25 may be used to select questions stored on the management processing system 20 (question bank) and group them together as part of a collective test or assignment. Each test or assignment may be associated with one or more categories, difficulty levels, encryption, and study code(s). Dependencies may be created from one test to another, or from one question to another, meaning that the student may need to complete one test or question before proceeding to the next, dependent test or question. For instance, when a dependency is set or defined, the student must take the test or complete the assignment(s) in a particular order defined by the dependency. For instance, in order to take a test or assignment, the student can access the system 10 or method 100 via a student device, which, as described herein, can include virtually any computer device, such as, but not limited to, a desktop or laptop computer, tablet, mobile device such as a phone, etc. In some embodiments, during the test or assignment, e.g., while the student is taking the test or assignment, the student can only access or see a defined number (e.g., one) of questions at a time. Thus, when taking the test or assignment, in at least one embodiment, the student may not be able to access all of the questions at once (e.g., on a single, scrollable screen), rather, the student must sequentially step through the questions or in some embodiments select questions via a menu. However, once the test or assignment is completed, the student may be able to access all of the questions (and in some cases, the answers) on a single page or screen, for instance, using a "view" function.

Figure 7A:
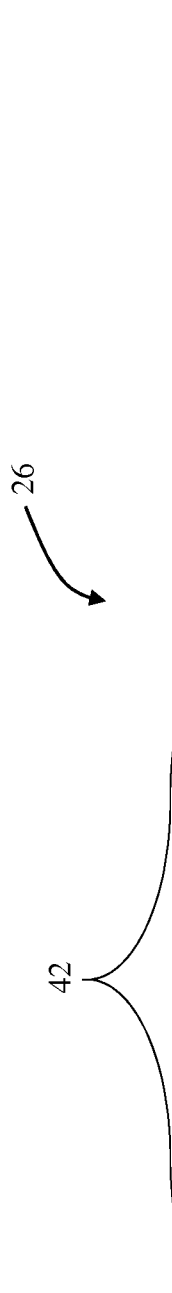
FIG. 7A is a schematic representation of an exemplary screenshot illustrating the results display module as disclosed in accordance with at least one embodiment of the present invention.

Still referring to FIG. 4A, the method 100 further includes scoring the test or assignment, generally represented at 112 and displaying the score via a results display module, as shown at 114. In particular, once a test or assignment is completed, the system 10 and method 100 of the present invention is configured or structured to automatically score the test or assignment and display the score on a results display module 26. For example, as shown in FIG. 7A, the results display module 26 may display a plurality of result data which includes a test or assignment name, the raw points achieved by the student during the test (e.g., how many questions were answered correctly), fractional score, percentage score, time spent on the test or assignment, the date the test or assignment was completed, and the number of wrong answered questions ("WAQ"), i.e., the number of questions the student answered incorrectly.

Furthermore, following the completion of a test or assignment, the student 36 or other user (e.g., teacher, director or supervisor) may review the test or assignment, and particularly, the questions and answers provided by the student 36 during the test or assignment. For instance, FIG. 8 represents a partial view and exemplary screenshot of a review module 27 which is structured to display at least some of the questions 200 contained in the particular test or assignment, along with the corresponding answer(s) 202 provided and the corresponding question code 210 or study code 220. Particularly, the review module 27 may automatically generate a list or compilation of all of the questions contained in the corresponding test or assignment or, in some embodiments, only those questions for which the student 36 provided an incorrect answer 202. Other information may be provided by the review module 27, including, for example, a difficulty level associated with each question, number of points obtained by the student or student's answer for each questions, and in some embodiments, a location where the student or other user can input notes, comments, etc. next to each question.

For example, after the completion of a test or assignment, students may need to see or review the questions that he or she answered incorrectly, or wrong answered questions (WAQ). The review module 27 can allow the student to refer back to the questions answered incorrectly, either recently (e.g., within the last day or week) or historically (e.g., months or years ago). In addition, there is a "Study Guide Notes" section within the review module 27 in which students or other users can input or type the solution or explanation of the questions/answer, for example, based upon the student's review of study materials, a teacher's lecture, etc. The student can therefore use the review module 27 to access old tests or assignment, and review old notes at any time.

Furthermore, the method 100 of at least one embodiment comprises displaying the study codes for wrong answered questions, generally referenced as 116. Accordingly, in at least one embodiment of the review module 27, the study code 220 is displayed for each question 200, as shown in FIG. 8, allowing the user to access study materials 250 corresponding to the same study code 220. In some embodiments, it should be noted that the study code 220 may only be displayed for questions 200 in which an incorrect answer was provided. Particular, the study materials (accessed via the study code 220) are designed to allow the student to refine his or her knowledge in weak areas, or in subject areas, categories, sub-categories, etc. in which an incorrect answer was provided. Although, some embodiments may display the study code 220 for all questions 200, regardless of whether the student provided a correct answer or an incorrect answer. It should also be noted that in some embodiments, the study code 220 is only displayed or provided to the student after a test or assignment is completed, meaning that the student must first take a test or assignment before having access to the particular study codes 220.

Retrieval and access to the study materials 250, as shown at 118, corresponding to a study code 220 may be accomplished in a number of different manners. Specifically, the system 10 and method 100 will retrieve study materials in response to a request submitted by the student. For instance, in one embodiment, in order to submit the request for study materials, the student 36 or user may simply click on the study code 220 within the review module 27 or other location within the system 10 and method 100 of the present invention. Accordingly, in such an embodiment, clicking on the study code 220 may direct the user or student 36 to the study materials 250. Clicking on the study code 220 may therefore activate an Individual Make-up Study ("IMS") or study material retrieval module 28. The retrieval module 28 will thus search for the corresponding study material 250 and display the study material 250 to the user for review.

In another embodiment, in order to submit the request for study materials, the student 36 or user may need to search for or enter the study code 220 into a separate area in order to access the corresponding study materials. Particularly, referring to FIG. 9A, for example, a user or student 36 may enter a study code "Math GST" or "IMS Math GST" into a designated search entry box, wherein the system 10 and method 100 will retrieve the corresponding study materials 250 from the management processing system 20 via the retrieval module 28.

Figure 9A:
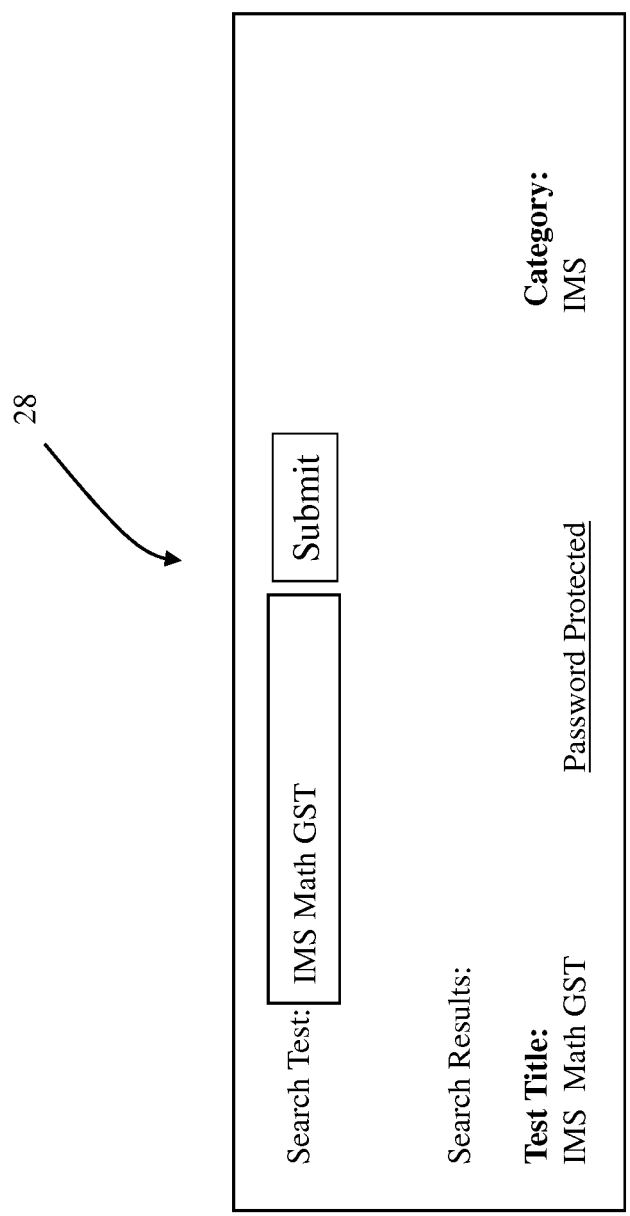
FIGS. 9A through 9C are schematic representations of exemplary screenshots illustrating the IMS study material retrieval module as disclosed in accordance with at least one embodiment of the present invention.
Figure 9B:
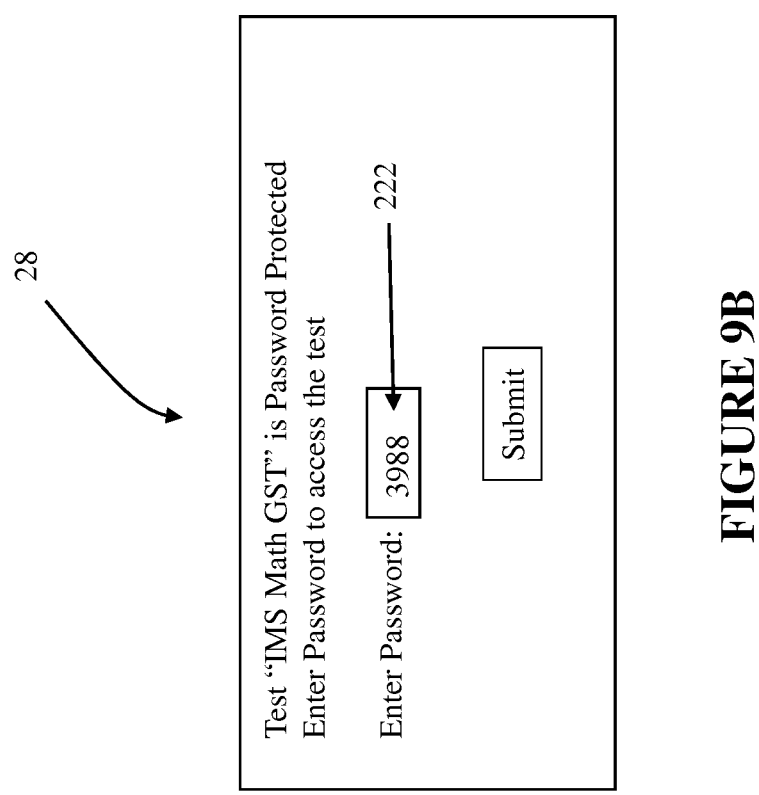
Figure 9C:
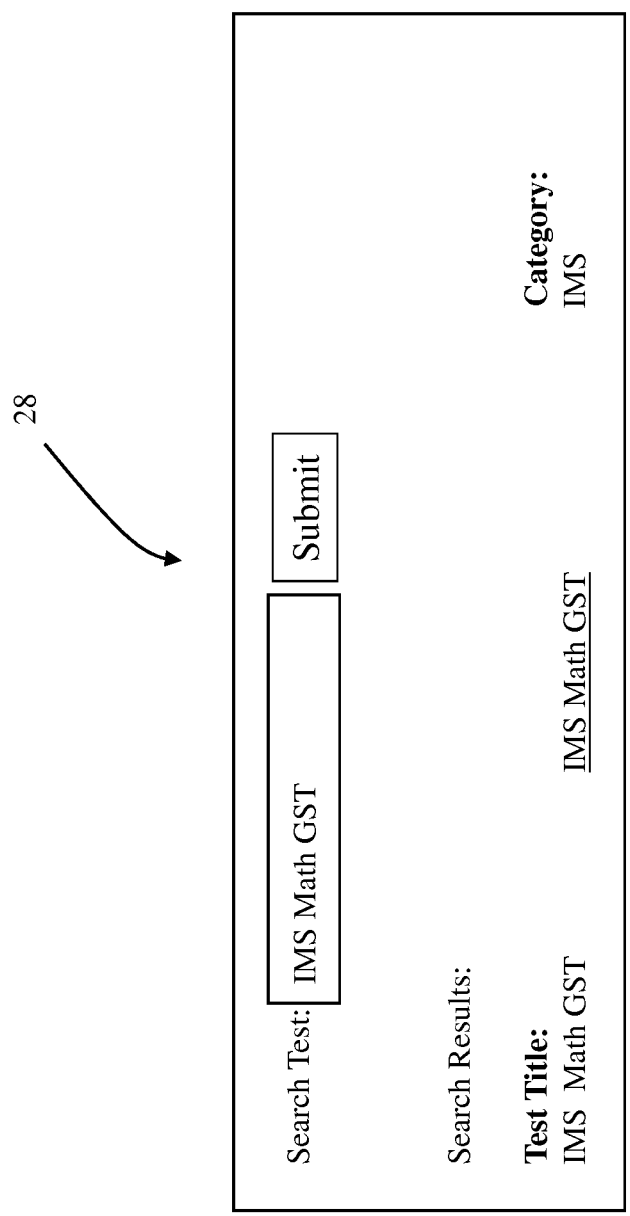

In some embodiments, the study materials 250 are password protected or encrypted such that a user must also enter a corresponding study material password in order to access the study materials. For instance, still referring to FIG. 9A, upon entry of the study code 220, a list of matching study materials may be provided or displayed to the user. In the illustrated example, the "IMS Math GST" study materials are password protected. Clicking on or activating the "password protected" link, the student can then enter the provided password 222 into a designated entry box or location, as shown in FIG. 9B. Particularly, referring briefly back to FIG. 8, the review module 27 is configured to display the study code 220 along with the corresponding password 222 for each question 200 or for each wrong answered question (WAQ). With a successfully entered password, the list of matching study materials may be updated, as shown in FIG. 9C where the "password protected" label from FIG. 9A is replaced with an active link, in this case, labeled "IMS Math GST." Upon clicking on the link, the retrieval module 28 will retrieve and display the corresponding study materials 250, as shown in FIG. 9D, for example. Particularly, as provided herein, the study materials 250 may include written explanations, diagrams, etc. 252 along with sample or example questions and answers 254 that pertain to or otherwise correspond with the study code(s) 220. As above, the study codes 220 relate to a specific subject area 300 and one or more categories, sub-categories, difficulty level, etc.

Figure 4B:
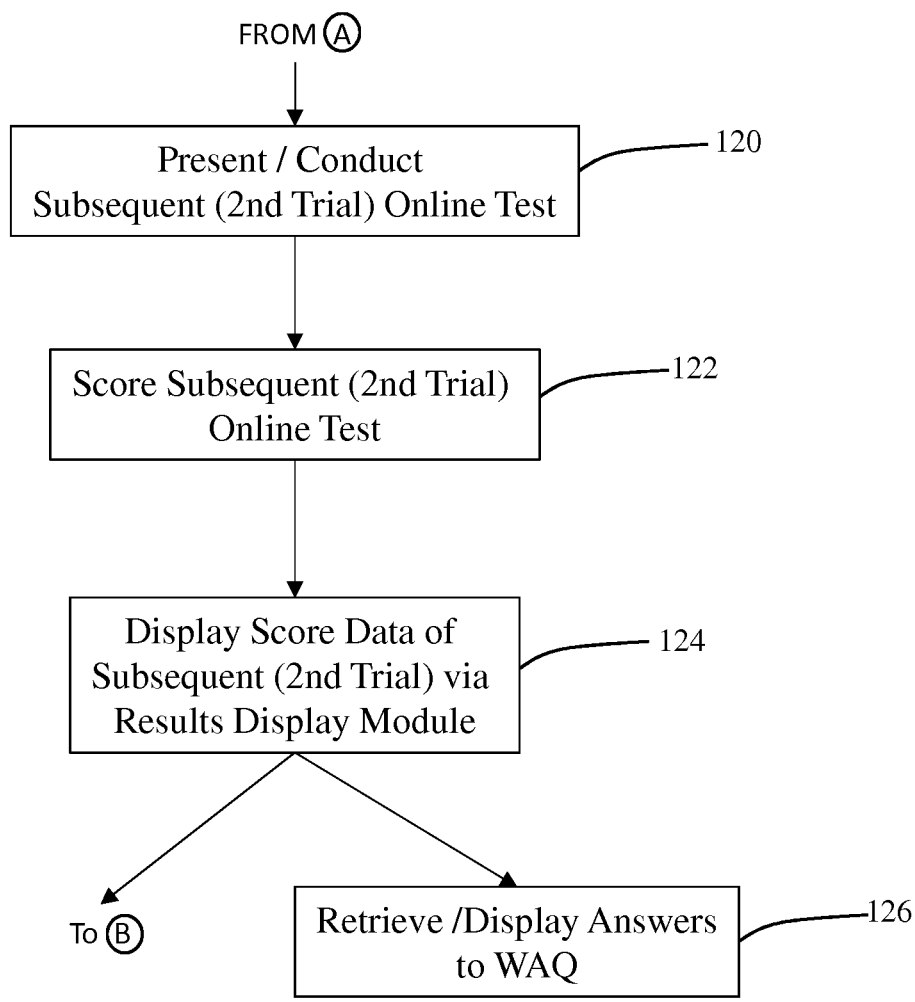

Further features of at least one embodiment of the present invention allow the student 36 to conduct a second trial or a subsequent online test. For instance, referring now to the flow chart of FIG. 4B, at least one embodiment of the method 100 further includes presenting and/or conducting a subsequent (second trial) online test, generally referenced as 120. For example, the student 26 may take the same online test a second or subsequent time wherein the subsequent test includes the same or substantially the same questions 200 as the first or previous trial or online test.

However, it is contemplated that in at least one embodiment, the subsequent or second trial online test comprises only those questions 200 in which the student answered incorrectly (WAQ). In this regard, the student can review his wrong answered questions on his or her own time and preferably before he or she attends class or views a lecture on the materials or on the test itself. For instance, if the student can understand the correct answer to the question or problem on his or her own time, he or she will oftentimes be able to save class time with the teacher for other questions. If the student does not understand the solution to a question, then he or she can bring the question to the teacher for an explanation.

Referring back to FIG. 7A, the exemplary results display module 26 shows the results of a test after the first trial is completed. For example, referring to the first row for "SAT_PRACT_1," the results shown indicate that the student answered two (2) questions incorrectly on the first trial or on the first time the student took this particular test. This is shown by the number "2" under the column "WAQ." In at least one embodiment, the student may click on the indicated WAQ, for example, the number "2" under the WAQ column, in order to view the questions in which the student answered incorrectly. Upon doing so, a subsequent test or WAQ module 29 is activated which is structured to retrieve the wrong answered questions for the corresponding test and present them to the student via a subsequent or second trial test. As mentioned above, the subsequent or second trial test may include only wrong answered questions or all of the questions in the previous test (whether answered correctly or incorrectly).

Figure 7B:
FIG. 7B is a schematic representation of an exemplary screenshot illustrating an identification of incorrectly answered questions.
Figure 7B:

For example, in one embodiment, the subsequent test or WAQ module 29 may display all of the questions or all of the wrong answered questions to the student allowing the student to answer the questions again in a subsequent test or a second trial. In one embodiment, upon clicking on the WAQ column entry of FIG. 7A (in this example, the number "2"), the subsequent test or WAQ module will display the question numbers 40 for the questions which were answered incorrectly, as shown in FIG. 7B, for example. Upon clicking or activating one of the question number 40 representing the WAQ, the subsequent test or WAQ module 29 will retrieve and display the corresponding question to the student, as shown in FIG. 7C, allowing the student to answer the question again.

Referring again to FIG. 4B, the method 100 further includes scoring the subsequent online test or second trial, generally represented at 122, and displaying the score of the subsequent online test or second trial on the results display module, as represented at 124. For instance, as the student completes the subsequent test, the system 10 and method 100 will determine whether the student or user entered or answered the correct or incorrect response. In certain embodiments, the scoring of the subsequent test or second trial may be dynamic, meaning that the score will be updated as the student answers the questions, such that the entire subsequent test need not be completed for the subsequent test score to be determined. For example, if the number of WAQ is two, as in the example provided, if the student accesses the subsequent test or WAQ module and only answers one of the WAQ, and happens to answer it correctly, then the subsequent score will update to reflect the new score, even if the student did not answer all of the WAQ. Other embodiments may require the student to answer all of the WAQ or all of the questions in the subsequent test before the score of the subsequent test is determined.

FIG. 7D illustrates the results display module with the scores for the initial test 42 and the subsequent test 44 provided. In addition, as shown in FIG. 7D, the results display module 27 of at least one embodiment will also display a combined score 45, which represents the added score of between both the initial test and the subsequent test. Furthermore, if, after the subsequent test, there are still wrong answered questions (WAQ), for instance, if the student answered the questions incorrectly on the second or subsequent test, then the results display module 26 of at least one embodiment will display a second trial or subsequent WAQ column 46. Clicking on the subsequent WAQ 46 entry will activate a results module 48 shown in FIG. 7E, which will display the correct answer for each of the questions in which an incorrect answer was provided in the subsequent or second trial test. Accordingly, the method 100 further includes retrieving and displaying answers to WAQ, as shown at 126 in FIG. 4B, for example.

Additional features of certain embodiments of the present invention further include a frequency of wrong answered questions (FWA) module 60, which is structured and configured to process tests or assignments completed by a plurality of students and determine a frequency or number of students who answered a particular question incorrectly. For instance, because class time is limited, there is often not enough time for the teachers/students to review every single question from a particular test or assignment. Therefore, the FWA module 60 of at least one embodiment is designed to help save time and focus the lesson or lecture on questions that are determined to be of a higher difficulty level or questions which were answered incorrectly by the most number of students. Without an indication of the frequency of wrong answered questions, teachers and students may waste time and effort reviewing a question that all or most of the students answered correctly.

For example, referring to the exemplary screenshot schematic of FIG. 10, an exemplary FWA module 60 is presented. In this example, the FWA module 60 presents the questions on a separate row, identifying the question number, question code, difficulty level, category, test, and the frequency of wrong answered questions in a fraction and percentage. In particular, for the first question (question number 13), twenty two (22) students answered the question, and all twenty two (22) answered the question incorrectly. For the second question listed (question number 19), twenty (20) students answered the question, and nineteen (19) students answered the question incorrectly. Accordingly, the FWA module of at least one embodiment shows the number of students who answered a particular question incorrectly and it generates a ratio and/or percentage based upon the number of students who answered the question wrong versus the number of students who took the test or answered the question. If the ratio or percentage is high on a particular question, the difficulty level of the question is often also high. Likewise, if the ratio or percentage is low, then the difficulty level is often also low.

In some embodiments, the questions can be sorted, for example, by FWA fraction or FWA percentage to show the questions that have the highest frequency of incorrect responses at the top. Other embodiments may sort or allow the list to be sorted by other columns, such as the question number, test identification, etc.

Thus, using the FWA module 60, teachers and students can focus the lecture and/or review in order of those questions with the highest difficulty level or with the highest percentage or ratio of incorrectly answered questions. This ensures that the harder questions will be given the time it needs for the students to understand the nature of the question and material.

Referring now to FIG. 11, yet another embodiment of the present invention includes an online report or usage log module, generally represented as 65. Specifically, the system 10 and method 100 of at least one embodiment of the present invention may be structured to track and analyze the progress of the students, for example, by tracking and reporting the student's historical data relating to completed assignments, including test title, date and time completed, first and second trial scores, etc.

It should be noted that in some embodiments, and in particular for students enrolled in grade school, elementary school, high school, for example, parents of the students may be able to log into the system and retrieve the online report, as exemplified in FIG. 11. This allows the parents to log in and view their child's updated progress any time. This also means that directors, supervisors and teachers may not need to create progress reports, as the parents can log into the system and access the progress reports automatically generated by the system 10 and method 100 at any time.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A method for presenting an online study guide and testing program, the method comprising:

presenting and conducting an online test via at least one computer processor of a management processing system disposed in a communicative relation with at least one student device via at least one communication network, the at least one management processing system further comprising a memory and a storage device, the online test comprising a set of test questions compiled from a plurality of test questions stored on the at least one management processing system, associating, via the at least one computer processor, each of the plurality of test questions with a question code, defining the question code as comprising at least a subject area component, a test identification component, a question identification component, a study code, the study code of the question code comprising a set of characters that, according to a study code look-up table, uniquely correspond to at least one pre-defined category within the subject area component of the question code, associating, via the at least one computer processor, a plurality of study materials with study codes, the plurality of study materials comprising at least a plurality of related sample questions and answers, wherein test questions and study materials associated with a common study code are associated with a common pre-defined category, at least some of the plurality of study materials being password-protected study materials, each of the password-protected study materials being associated with a human-readable password, scoring, via the at least one computer processor, the online test relative to at least one student, displaying, on the student device, result data corresponding to the online test via a results display module generated via the at least one computer processor, the result data comprising a test identification component, at least one score component, and a wrong answered questions component, displaying, via the at least one computer processor, the study code associated with at least one wrong answered question, and displaying the human-readable password associated with the study materials associated with the study code, the at least one wrong answered question comprising at least one of the plurality of test questions wherein a wrong answer was provided during the online test, upon receiving a user selection of the study code associated with the at least one wrong answered question on the student device, cross-referencing, via the computer processor, the study materials corresponding to the same study code, and retrieving the study materials associated with the same study code, upon receiving a user search for at least one of the password-protected study materials, requesting manual user entry of the human-readable password associated with the at least one of the password-protected study materials, upon receiving the human-readable password associated with the at least one of the password-protected study materials, displaying the at least one of the password-protected study materials on the student device, presenting and conducting a subsequent online test, via the at least one processor, comprising at least one wrong answered test question, wherein the wrong answered test question comprises at least one of the plurality of test questions wherein a wrong answer was provided in the online test, scoring, via the at least one processor, the subsequent online test relative to the at least one student, and displaying, via the at least one processor, the score of the subsequent online test via the results display module.

2. The method as recited in claim 1 wherein the results display module is structured to simultaneously display both the score of the online test and the score of the subsequent online test.

3. The method as recited in claim 1 further comprising defining the study materials as comprising at least one of: a written explanation of a corresponding test subject, a sample question and a sample answer corresponding to a test subject, and a practice question corresponding to the test subject.

4. The method as recited in claim 1 further comprising displaying the study code only for wrong answered questions.

5. A method for presenting an online study guide and testing program, the method comprising:

storing a plurality of test questions on at least one management processing system, the at least one management processing system comprising a computer processor, a memory and a storage device, the at least one management processing system being communicative with at least one student device via at least one communication network, defining each of the plurality of test questions as being associated with at least one pre-defined topic, associating at least some of the plurality of test questions with a question code, the question code comprising a subject area component, a test identification component, a question identification component, a study code, and a human-readable password, the study code comprising a set of characters that, according to a study code look-up table, uniquely correspond to the at least one pre-defined topic, wherein the study code links the corresponding test question with the pre-defined topic, associating the study code with password-protected study materials corresponding to the same pre-defined topic, the plurality of password-protected study materials comprising at least a plurality of related sample questions and answers, wherein a test question associated with a study code and password-protected study materials associated with the same study code correspond to a common pre-defined topic, presenting and conducting an online test via the at least one management processing system and the at least one student device, the online test comprising a subset of the plurality of test questions, scoring the online test relative to at least one student, displaying the score of the online test via a results display module, the score comprising a test identification component, at least one score component, and a wrong answered questions component, displaying the study code associated with at least one wrong answered question, the at least one wrong answered question comprising at least one of the plurality of test questions wherein a wrong answer was provided during the online test, upon selection of the study code associated with the at least one wrong answered question on the student device, cross-referencing the password-protected study materials corresponding to the same study code, and retrieving the password-protected study materials associated with the same study code, and upon manual entry of the study code in a search module, cross-referencing the password-protected study materials corresponding to the same study code, and requesting manual entry of the human-readable password into an entry box presented on the student device, the human-readable password being previously presented with the at least one wrong answered question, upon receiving the manual entry of the human-readable password, retrieving the password-protected study materials associated with the same study code.

6. The method as recited in claim 5 further comprising defining the password-protected study materials as comprising at least one of: a written explanation of a corresponding test subject, a sample question and a sample answer corresponding to a test subject, and a practice question corresponding to the test subject.

7. The method as recited in claim 5 further comprising presenting and conducting a subsequent online test comprising at least one wrong answered test question.

8. The method as recited in claim 7 further comprising scoring the subsequent online test relative to the at least one student, and displaying the score of the subsequent online test via the results display module.

9. The method as recited in claim 8 wherein the results display module is structured to simultaneously display both the score of the online test and the score of the subsequent online test.

10. An online study system, comprising:
at least one management system comprising a computer processor, a storage device, memory and a communication module, said at least one management system being disposed in a communicative relation with at least one communication network for controlled access by at least a student device and a teacher device,
a plurality of test questions stored on said storage device for remote access by the at least one student device for taking an online test, said online test comprising a subset of said plurality of test questions, wherein at least some of said plurality of test questions are associated with a question code, said question code comprising a subject area component, a test identification component, a question identification component, and at least one study code, said study code comprising a set of characters that, according to a study code look-up table, uniquely correspond to at least one pre-defined topic, wherein said study code links the corresponding test question with the pre-defined topic,
a plurality of study materials stored on said storage device, each of said plurality of study materials being associated with said at least one study code and a password, wherein a test question and study materials that are associated with a common study code also correspond to a common pre-defined topic, said plurality of study materials being accessible by the student device via submission of a request comprising a corresponding study code and manual entry of a corresponding password into an entry box displayed on the at least one student device, the corresponding password being provided to a user with at least one wrong answered question, and
a results display module for displaying result data corresponding to said online test, said result data comprising a number of wrong answered questions corresponding to said online test.

11. The system as recited in claim 10 further comprising a study material retrieval module for retrieving study material corresponding to said study code and displaying said study material to the student device.

12. The system as recited in claim 11 further comprising a review module for identifying a plurality of wrong answered test questions and displaying said plurality of wrong answered test questions to the student device.

13. The system as recited in claim 12 wherein said study code is only displayed in connection with said plurality of wrong answered questions.

14. The system as recited in claim 13 further comprising a subsequent test module for presenting a second trial test comprising said wrong answered test questions and computing a second trial test score.

15. The system as recited in claim 14 wherein said results display module is further structured to display said second trial test score and a number of wrong answered questions corresponding to said second trial test.

* * * * *